US008214256B2

(12) United States Patent
Riedl et al.

(10) Patent No.: US 8,214,256 B2
(45) Date of Patent: Jul. 3, 2012

(54) SYSTEM AND METHOD FOR ADVERTISEMENT DELIVERY WITHIN A VIDEO TIME SHIFTING ARCHITECTURE

(75) Inventors: Steve Riedl, Superior, CO (US); Erik Urdang, Boulder, CO (US); Tom Gonder, Westminster, CO (US); Bryan Santangelo, Superior, CO (US); Brad Jordan, Boulder, CO (US)

(73) Assignee: Time Warner Cable Inc., Stamford, CT (US)

( * ) Notice: Subject to any disclaimer, the term of this patent is extended or adjusted under 35 U.S.C. 154(b) by 1025 days.

(21) Appl. No.: 10/662,776

(22) Filed: Sep. 15, 2003

(65) Prior Publication Data

US 2005/0060745 A1 Mar. 17, 2005

(51) Int. Cl.
*G06Q 30/00* (2012.01)

(52) U.S. Cl. ............ 705/14.61; 705/14.56; 705/14.68; 705/14.72; 705/14.73

(58) Field of Classification Search .......... 705/14, 705/10, 14.61, 14.56, 14.68, 14.72, 14.73; 725/34, 35; 348/E7.071
See application file for complete search history.

(56) References Cited

U.S. PATENT DOCUMENTS

| | | | | |
|---|---|---|---|---|
| 5,659,350 A * | 8/1997 | Hendricks et al. | ............ | 725/116 |
| 5,659,653 A * | 8/1997 | Diehl et al. | ............ | 386/46 |
| 5,682,195 A * | 10/1997 | Hendricks et al. | ............ | 725/31 |
| 5,897,623 A * | 4/1999 | Fein et al. | ............ | 705/27 |
| 5,990,927 A * | 11/1999 | Hendricks et al. | ............ | 725/132 |
| 6,154,771 A * | 11/2000 | Rangan et al. | ............ | 709/217 |
| 6,169,542 B1 * | 1/2001 | Hooks et al. | ............ | 715/719 |
| 6,201,536 B1 * | 3/2001 | Hendricks et al. | ............ | 715/716 |
| 6,363,411 B1 * | 3/2002 | Dugan et al. | ............ | 709/202 |
| 6,418,461 B1 * | 7/2002 | Barnhouse et al. | ............ | 709/201 |
| 6,588,013 B1 * | 7/2003 | Lumley et al. | ............ | 725/32 |
| 6,704,930 B1 * | 3/2004 | Eldering et al. | ............ | 725/36 |
| 6,718,551 B1 * | 4/2004 | Swix et al. | ............ | 725/32 |
| 6,756,997 B1 * | 6/2004 | Ward et al. | ............ | 715/716 |
| 6,941,573 B1 * | 9/2005 | Cowan et al. | ............ | 725/9 |
| 7,146,630 B2 * | 12/2006 | Dravida et al. | ............ | 725/111 |
| 7,212,979 B1 * | 5/2007 | Matz et al | ............ | 705/1 |
| 7,260,823 B2 * | 8/2007 | Schlack et al. | ............ | 725/9 |
| 7,343,614 B1 * | 3/2008 | Hendricks et al. | ............ | 725/8 |
| 7,454,510 B2 * | 11/2008 | Kleyman et al. | ............ | 709/231 |
| 7,487,112 B2 * | 2/2009 | Barnes, Jr. | ............ | 705/26 |
| 2001/0032333 A1 * | 10/2001 | Flickinger | ............ | 725/39 |
| 2002/0010679 A1 * | 1/2002 | Felsher | ............ | 705/51 |

(Continued)

OTHER PUBLICATIONS www.claritas.com/claritas Prizm Marketing, Prizm Marketing Analysis, Consumer Behavior Segmentation, Dec. 7, 2007.*

(Continued)

*Primary Examiner* — John Weiss
*Assistant Examiner* — Adam Chornesky
(74) *Attorney, Agent, or Firm* — Seth H. Ostrow; Ostrow Kaufman LLP

(57) ABSTRACT

The present invention is directed to systems and methods for creating a program for delivery to a client in a video time shifting architecture. The system of the present comprises an advertisement selection system (ADS) operative to select one or more advertisements and transmit one or more identifiers that uniquely identify the selected advertisements and an advertisement management system (AMS) operative to generate a playlist that identifies content. The playlist includes a user requested time shifted program and the one or more selected advertisements. A video server is operative to interpret the playlist and deliver the content to the user.

48 Claims, 19 Drawing Sheets

U.S. PATENT DOCUMENTS

| | | | |
|---|---|---|---|
| 2002/0072966 A1* | 6/2002 | Eldering et al. | 705/14 |
| 2002/0078444 A1* | 6/2002 | Krewin et al. | 725/35 |
| 2002/0087980 A1* | 7/2002 | Eldering et al. | 725/35 |
| 2002/0090198 A1* | 7/2002 | Rosenberg et al. | 386/52 |
| 2002/0123928 A1* | 9/2002 | Eldering et al. | 705/14 |
| 2002/0144262 A1* | 10/2002 | Plotnick et al. | 725/32 |
| 2002/0144263 A1* | 10/2002 | Eldering et al. | 725/34 |
| 2002/0161609 A1* | 10/2002 | Zizzamia et al. | 705/4 |
| 2002/0178447 A1* | 11/2002 | Plotnick et al. | 725/36 |
| 2002/0184047 A1* | 12/2002 | Plotnick et al. | 705/1 |
| 2003/0006911 A1* | 1/2003 | Smith et al. | 340/988 |
| 2003/0007516 A1* | 1/2003 | Abramov et al. | 370/535 |
| 2003/0039465 A1* | 2/2003 | Bjorgan et al. | 386/20 |
| 2003/0040962 A1* | 2/2003 | Lewis | 705/14 |
| 2003/0050834 A1* | 3/2003 | Caplan | 705/14 |
| 2003/0058707 A1* | 3/2003 | Dilger et al. | 365/200 |
| 2003/0066078 A1* | 4/2003 | Bjorgan et al. | 725/34 |
| 2003/0074661 A1* | 4/2003 | Krapf et al. | 725/34 |
| 2003/0130887 A1* | 7/2003 | Nathaniel | 705/14 |
| 2003/0154128 A1* | 8/2003 | Liga et al. | 705/14 |
| 2003/0231854 A1* | 12/2003 | Derrenberger | 386/46 |
| 2004/0003398 A1* | 1/2004 | Donian et al. | 725/34 |
| 2004/0019900 A1* | 1/2004 | Knightbridge et al. | 725/23 |
| 2004/0034874 A1* | 2/2004 | Hord et al. | 725/136 |
| 2004/0103429 A1* | 5/2004 | Carlucci et al. | 725/32 |
| 2004/0117819 A1* | 6/2004 | Yu | 725/32 |
| 2004/0128198 A1* | 7/2004 | Register et al. | 705/14 |
| 2004/0268384 A1* | 12/2004 | Stone | 725/32 |
| 2004/0268387 A1* | 12/2004 | Wendling | 725/35 |
| 2005/0060742 A1* | 3/2005 | Riedl et al. | 725/34 |
| 2005/0060745 A1* | 3/2005 | Riedl et al. | 725/42 |
| 2005/0097599 A1* | 5/2005 | Plotnick et al. | 725/32 |
| 2005/0251820 A1* | 11/2005 | Stefanik et al. | 725/34 |
| 2009/0030802 A1* | 1/2009 | Plotnick et al. | 705/14 |

OTHER PUBLICATIONS www.interactivetvweb.org/tutorial/mhp/synchronization.shtml Synchronizing applications and media: The Interactive TV Web 1-6, accessed Jan. 29, 2008.*

ANSI-SCTE 35 2007; Digital Program Insertion Cueing Message for Cable; American National Standard; Engineering Committee; Digital Video Subcommittee; Society of Telecommunications Engineers.*

ITU-T Telecommunication Standardization Sector of ITU; ITU Recommendation F.902; Feb. 1995; Operations and Quality of Service Human Factors; International Telecommunication Union.*

ITU-T Telecommunication Standardization Sector of ITU; ITU Recommendation Q.23; Feb. 1995; General Recommendations on Telephone Switching and Signalling; International Automatic and Semi-Automatic Working; Technical Features of Push-Button Telephone Sets.*

* cited by examiner

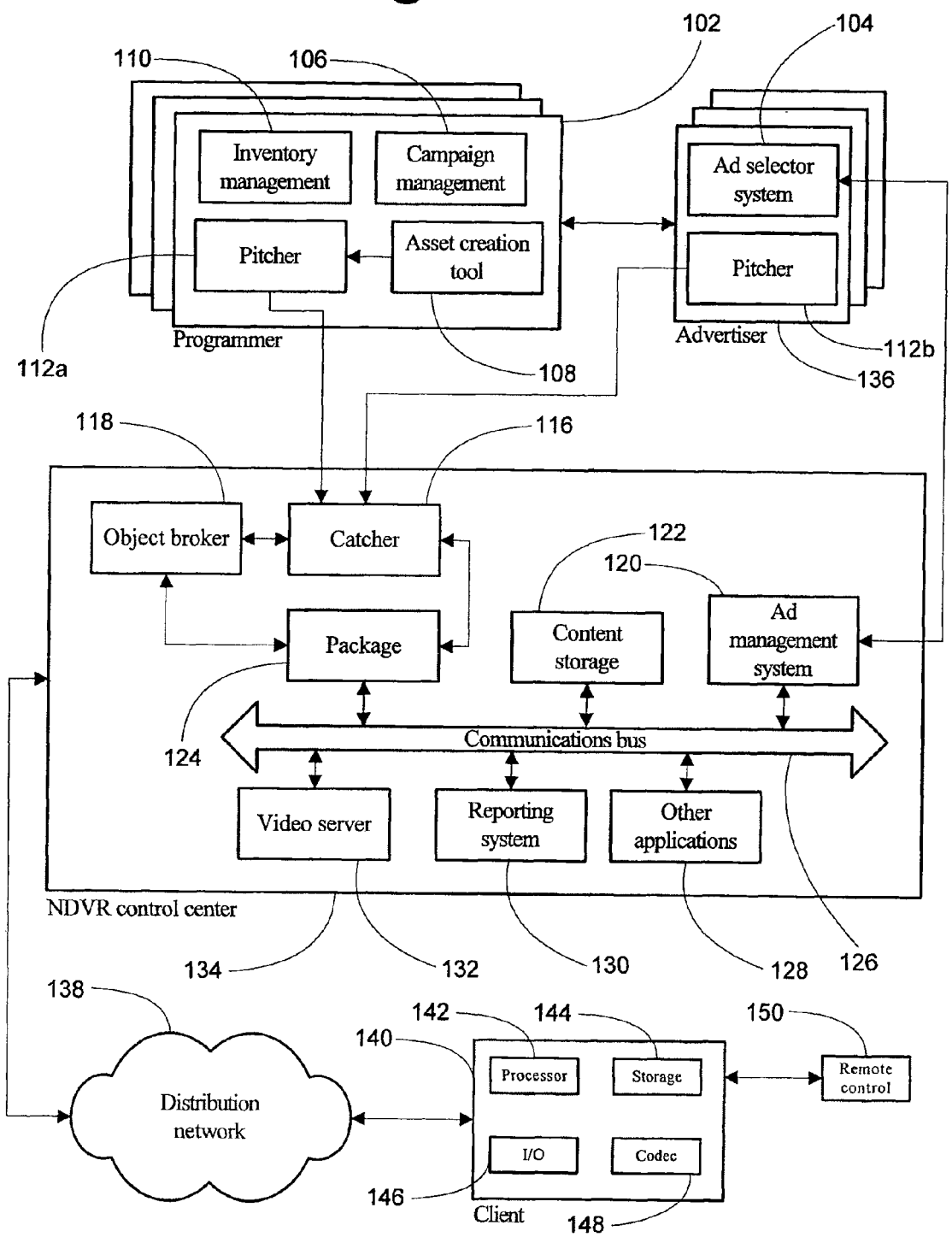

SYSTEM AND METHOD FOR ADVERTISEMENT DELIVERY WITHIN A VIDEO TIME SHIFTING ARCHITECTURE

RELATED APPLICATIONS

This application is related to the following commonly owned patent application, which is hereby incorporated by reference herein in its entirety:

application Ser. No. 10/302,550, titled "PROGRAM GUIDE AND RESERVATION SYSTEM FOR NETWORK BASED DIGITAL INFORMATION AND ENTERTAINMENT STORAGE AND DELIVERY SYSTEM," filed Nov. 22, 2002.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to the distribution of additional content, such as commercials and other advertising, interspersed with a video program, e.g., television programs. More particularly, the present invention relates to the distribution of additional content interspersed with a video program within a video time shifting architecture, one embodiment of which is a network digital video recorder (NDVR) architecture.

The NDVR content distribution architecture presents a fundamentally new video asset distribution paradigm that empowers consumers with greater control, choice and convenience. Advantageously, the NDVR architecture allows consumers of video content to customize their viewing experience, including the ability to pause live broadcast television, restart or rewind shows currently in progress, fast forward and rewind prerecorded programs and record multiple programs simultaneously. Furthermore, this paradigm provides new opportunities for the delivery of advertisements, such as advertisements delivered with on demand video assets, as well as playback of prerecorded programs with additional or replacement advertising through the functionality that the NDVR architecture provides.

There is thus a need for novel systems and methods to capitalize upon the advertisement distribution opportunities that an NDVR content distribution architecture presents.

BRIEF SUMMARY OF THE INVENTION

A number of solutions are described herein for supporting advertisement distribution within a video time shifting architecture. For example, the systems and methods of the present invention may provide bumper advertisements, which are advertisements inserted before or after a client requested program, pause advertisements presented when a client sends a pause control command to a video server or additional and replacement advertisements. Furthermore, the present invention provides functionality for targeting both the bumper and pause advertisements that the client views.

According to one embodiment, the present invention consists of a system for creating a program for delivery to a client in a video time shifting architecture. The system comprises an advertisement selection system (ADS) operative to select one or more advertisements and transmit one or more identifiers that uniquely identify the selected advertisements, as well as an advertisement management system (AMS) operative to request content from an ADS and generate a playlist that identifies content, including a user requested time shifted program and the one or more selected advertisements. A video server is operative to interpret the playlist and deliver the content to the user. The components of the present invention may also generate a dynamic playlist whereby the content identified in a playlist is modified after delivery to the video server.

The AMS is responsible for generating playlists to instruct the video server as to the proper video to deliver to a client in response to control commands that the client generates. Accordingly, the playlist, which is a listing of content and may consists of the content itself or pointers to locations where the content is maintained, is composed of a client requested program and one or more advertisements. Advertisements may be identified as being used for specific purposes. For example, the AMS may generate a playlist that identifies a given one of the one or more advertisements as a bumper advertisement for delivery by the video server prior to the user requested program.

Alternatively or in conjunction, the AMS may generate a playlist that identifies a given one of the one or more advertisements as a pause teaser advertisement for delivery by the video server upon receipt of a pause control command and a playlist that identifies a given one of the one or more advertisements as a pause advertisement for delivery by the video server upon receipt of a pause advertisement control command. Furthermore, the playlist is indexed to allow the video server to locate different segments within the playlist, e.g., a client requested program and one or more commercials. According to one embodiment, the playlist is indexed according to Normal Play Time (NPT), thereby allowing the client to be completely unaware of the advertising content and making it nearly impossible for the client to employ ad skipping functionality due to the fact that the playlist is viewed by the client as a single piece of content.

The video server is operative to receive control commands from a client and access content as defined by the playlist. For example, the video server is operative to receive a pause control command from a client, whereby either the client or the video server may mark the location in the playlist that corresponds to a point in time when the video server receives the pause command and advance to the index of an advertisement in the playlist. In response, the client may display a pause video still window upon transmission of a pause control command, which includes operating instructions. According to one embodiment, transmitting a pause control command causes the video server to advance to a pause teaser advertisement in the playlist and begins delivery of the pause teaser advertisement to the client for display. Similarly, when the video server receives a pause advertisement control command, it advances to and begins delivery of a pause advertisement. When a resume command is received, the video server returns to the location in the playlist that corresponds to a point in time when the video server receives the pause command and commences delivery of the user requested program. According to an alternative embodiment, the client may mark the pause position in the playlist and transmit the position to the video server. For example, when the client issues a pause control command, it marks the NPT index of where the pause control command was issued and requests that the video server play the content from an NPT index that represents the pause teaser advertisement. One or more NPT indexes for pause teaser advertisements may exist through which the client may cycle.

The ADS is operative to select one or more advertisements according to a targeting algorithm, which preferably operates on the basis of aggregate viewing information. Furthermore, the ADS may comprise a connection to an external targeting system. One example of an external targeting system is a PRIZM system. The ADS or a similar associated advertisement selection system transmits advertisements and advertisement metadata to the AMS, which is also referred to by the acronym ADM, for persistent storage. The terminology of AMS and ADM are hence interchangeable as described and utilized herein. In response to receipt of a new advertisement, the ADM transmits an acknowledgement to the ADS upon receipt of the advertisement and advertisement metadata.

The system can contain multiple ADS modules. For example, a given ADS may target bumper and pause advertisements on a first network and another ADS may target pause and bumper advertisements on a second network. A third ADS may be used to select local replacement advertising for either original or expired content whereas a default ADS may supply content such as Public Service Announcements (PSA's) if no other ADS is available to satisfy the request.

As indicated above, the video server receives control commands from the user. When the user requests initiation of a program, the video server requests a new playlist from the ADM upon receipt of a new program initiation command. When requesting programming with advertising, the ADM determines whether the user is requesting a program with expired advertising as the present invention may be performing playback of content subsequent to its initial airing. Where advertising within a program has expired, the ADM transmits a request to the ADS to select one or more advertisements for replacement of expired advertising. Otherwise, the ADM transmits a request the ADS to select one or more advertisements included in the program as originally broadcast.

When the user initiates a new session, the ADM is called to determine the given advertisements that can be inserted into the requested content, e.g., bumper or pause advertisements. In facilitating this functionality, the ADM may contain a rights manager to calculate the number and types of advertisements that the ADM is allowed to deliver with the requested content. The rights manager may also contain information as to whether replacement advertisements are allowed or required.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 1 is a block diagram presenting a configuration of hardware and software components for advertisement distribution within an NDVR architecture according to one embodiment of the present invention;

DETAILED DESCRIPTION OF THE PREFERRED EMBODIMENTS

Figure 1A:
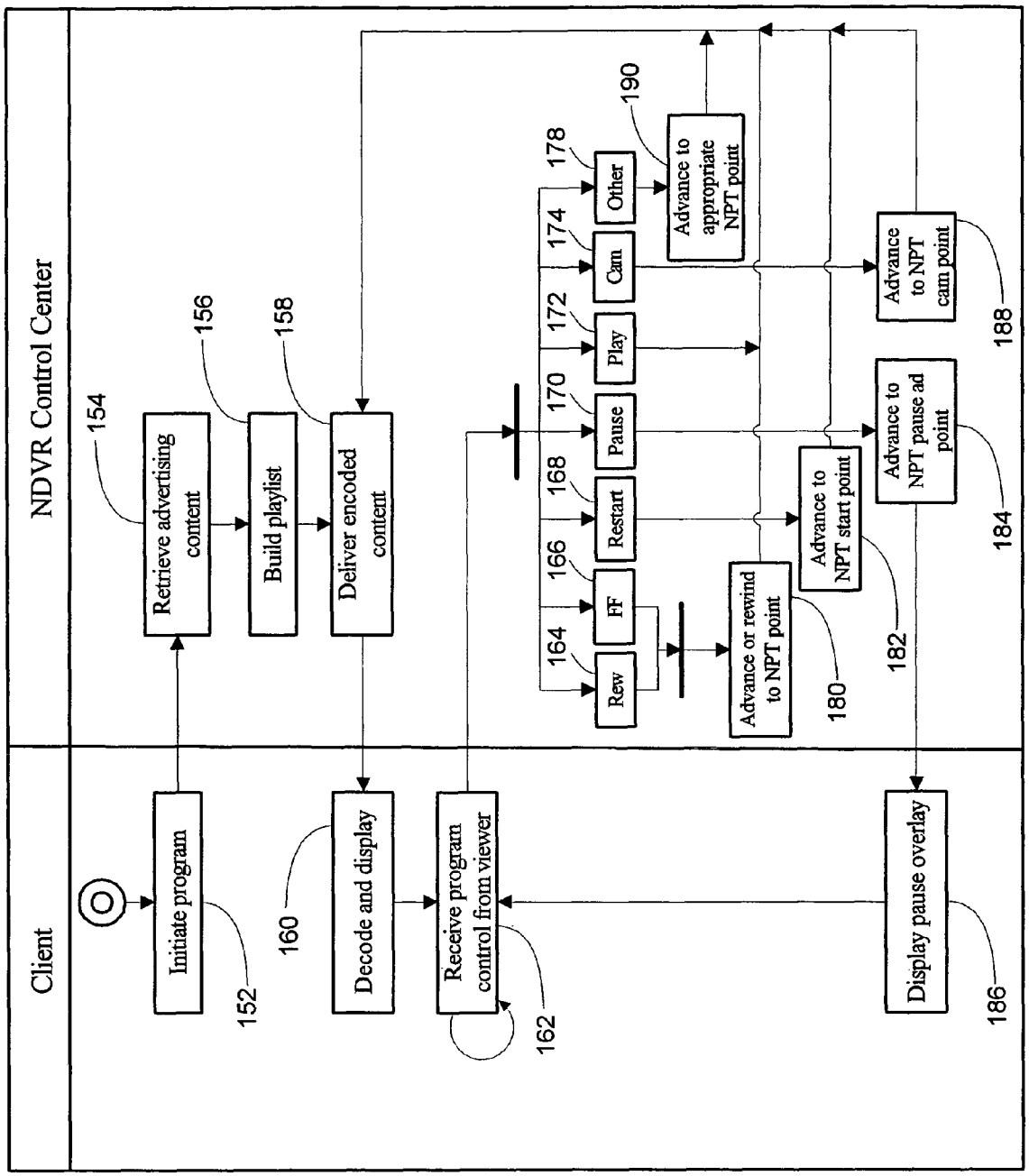
FIG. 1A is a swimlane diagram presenting the flow of control between a client and an NDVR control center according to one embodiment of the present invention.

With reference to FIGS. 1 through 15, embodiments of the invention are presented. FIG. 1 presents the configuration of the hardware and software components for advertisement distribution within an NDVR architecture according to one embodiment of the present invention. Typically, a plurality of programmers 102 are developing video programs for broadcast to consumers over various transmission media, such as, but not limited to, cable television, over-the-air broadcast, direct broadcast satellite, video and data networks such as the Internet, and other point to multipoint and multipoint to multipoint distribution systems.

A given programmer 102 creates an asset by using an asset creation tool 108. The asset creation tool 108 includes one or more software applications that the programmer 102 uses to generate the video asset. For example, where the programmer is creating an episode of the television program Friends™, he or she employs the use of a number of video editing tools to modify the program video, such as to segment or otherwise splice the video for later insertion of advertising assets, and encode the finished video for distribution to consumers. The programmer 102 employs an inventory management tool 110 to analyze the distribution demographics and determine the amount of advertising available.

The inventory management tool 110 informs the programmer 102 as to the amount of available advertising inventory (each of which is referred to as an "avail"). The programmer 102 communicates with one or more advertisers 136 to obtain advertising on the basis of this inventory, in other words, sell the avails to advertisers. The advertiser 136 identifies the substance and terms of the advertisement campaign as a set of metadata, e.g., a unique identifier, title, description, target audience, program in which the advertisement is to appear, day/time, etc., that it associates with the advertisement. The campaign management component 106 provides this functionality, which involves creating an advertising campaign out of available inventory. The advertiser 136 may package or format the metadata according to one or more data formatting languages known to those of skill in the art, for example, according to an eXtensible Markup Language (XML) schema. As is explained in greater detail herein, the present system allows an advertiser to use an arbitrarily complex metadata to describe the program.

The programmer 102 receives the advertisement and its metadata from the advertiser 136 and adds advertisement to a campaign through use of the campaign management tool 106. A campaign comprises a selection of advertisements and associated information as to the demographics to which the individual advertisements are to be shown. A programmer 102 uses the campaign manager 106 to package an advertisement for distribution by a distribution system, such as a cable television system. The programmer encodes the advertisement into a format suitable for distribution, such as the CableLabs® VOD format, described in the CableLabs® Video-On-Demand Content Specification, MD-SP-VOD-CONTENT-101-020327 (Mar. 27, 2002) and the International Organisation For Standardisation standard, ISO/IEC JTC1/SC29/WG11, Coding Of Moving Pictures And Audio, Short MPEG-2 description (October 2000), both of which are incorporated herein by reference in their entirety. Alternatively, the advertiser 136 may perform the encoding process on the advertisement and package it for delivery to the NDVR system.

The programmer 102 uses its distribution mechanism, such as a pitcher 112a, to transport the program to an NDVR control center 134 that provides NDVR functionality for one or more program or asset distribution systems. The NDVR control center 134 includes a receiving mechanism, such as catcher 116, that is in communication with pitchers from one or more programmers 102 or advertisers 136 to receive advertisement video and metadata for distribution. According one embodiment of the pitcher/catcher metaphor, content is sent from the programmer's "pitcher" 112a via satellite to a "catcher" server device 116 positioned at the NDVR control center 134. Alternative methods include IP transmission over the Internet, possibly utilizing a VPN (Virtual Private Network), SSH (Secure Shell), SSL (Secure Sockets Layer) or other secure transmission methods.

One or more advertisers 136 also operate pitchers 112b that are in communication with the catcher 116 at the NDVR control center 134. In this manner, advertisers 136 may supply advertisements directly to the NDVR control center 134 for use, as is explained in greater detail herein, in conjunction with NDVR functionality such as pause advertisements and bumper advertisements appended and prepended to programs that a consumer requests. The catcher 116 also generates one or more packages 124 from the advertisements that it receives directly from advertisers 136.

When the catcher 116 receives new assets, it passes a request to an object broker 118 to instantiate a new data structure or software object for storage of the asset and its metadata. According to one embodiment of the invention, the object broker 118 is a CORBA interface that provisions the package 124 according to the components that comprise the asset, e.g., one or more advertisements, teaser videos, graphics stills or other content items.

The NDVR control center 134 includes a communications bus 126 over which the NDVR control center's various components communicate, which is simply one embodiment of a software method for implementing inter-component messaging. The object broker 118 instantiates one or more packages 124, e.g., data structures or objects to maintain assets and metadata, which it passes to content storage 122 for persistent storage. The content storage utilizes one or more types of data stores known to those of skill in the art including, but not limited to, a relational database, an object-oriented database, a hybrid object-relational database or simply as files in a video optimized or typical file system well known to those of skill in the art.

The NDVR control center 134 is connected to a distribution network 138. According to one embodiment, the NDVR control center 134 provides NDVR fuinctionality to one or more headends or similar regional distribution centers over a distribution network 138. In this manner, the one or more headends pass control commands from their clients to the NDVR control center, which in turn supplies the NDVR functionality that a given client is requesting. Alternatively, any given headend in a video asset distribution system may comprise the components of the NDVR control center 134. According to this embodiment, the distribution network 138 comprises a number of clients, each typically including a set top terminal or other network access device such as a personal computer, with the NDVR control center 134 providing NDVR functionality directly to the clients.

The video server 132 receives control requests, e.g., play, pause, fast forward, rewind, etc., from clients over the distribution network 138 and performs an appropriate action. The video server 132 works in conjunction with other components of the NDVR control center 134 to deliver programming to clients over the distribution network 138. The video server 132 also receives control commands from clients, which are interpreted by logic at the video server to provide the response that the client is requesting. By way of example, when the client is watching live television and sends a pause control command over the network, the video server pauses the delivery of video data when it receives and interprets the control command.

Periodically, a client generates a command that the video server 132 interprets as creating a new avail. For example, assume that the client is watching a live program and sends a pause command to the video server 132. The pausing of the program that the client is viewing initiates a new session between the Video Server 132 and the client 140, creating an opportunity to present an advertisement to the client. Alternatively, when a client initiates playback of a previously recorded program, again initiating a new session, there is an opportunity to present additional advertisements both before and after playback, so called bumper advertisements. These new avails may be referred to as an NDVR advertisement, NDVR avail or simply new avails. In response to the creation of a new avail, the video server 132 sends a request for an advertisement to an advertisement management system (ADM) 120.

Advertisers 136 utilize an advertisement selection system (ADS) 104 to target advertisements in response to a request for fulfillment of an avail. The ADS 104 provides functionality that allow for selection of targeted advertising through both internal functionality and links to external advertisement targeting systems. When an advertiser 136 uses its pitcher 112b to transmit new advertising content to the NDVR control center 134, the ADM 120 must notify the given advertiser's ADS 104 of the new content arrival and provide a content directory for the new content. Similarly, when an advertisement is out of date or otherwise no longer needed, the ADS 104 requests the ADM 120 to delete the advertisement. Advertisers that provide NDVR advertisements to clients must also register with the ADM 120, in addition to transmitting the advertisement's video assets and metadata to the NDVR control center 134 for persistent storage in the content storage 122 data store. Accordingly, there may be a plurality of advertisers 136 in communication with the NDVR control center 134 at any given time.

According to one embodiment of the invention, each advertiser purchases the rights to NDVR avails that occur during a given session. The ADM 120 contacts one or more appropriate ADS 104 on the basis of the advertiser that owns the avails or the service being requested. For example, the ADM 120 maintains a matrix, map or other data structure that stores and correlates programs with advertisers, which is accessed and queried by the ADM 120 to identify one or more appropriate ADS 104 to serve advertisements for a given program. Associating an advertiser with a given program is discussed in greater detail herein. Furthermore, different ADS systems 104 may provide different avail types, for example, one ADS may register with the ADM 120 to provide pause advertisements while another ADS may provide only bumper or replacement ads.

The ADM 120 receives the request for one or more advertisements from the video sever 132, optionally checking a rights management database to determine if additional advertising can be added, and transmits an advertisement request to an advertisement selector system (ADS) 104 that an advertiser operates 136. Once the ADM 120 identifies one or more appropriate ADS(s) 104 to serve NDVR avails, the ADM 120 passes an avail request to the identified ADS(s) 104. The avail request may consist of a number of pieces of data regarding the client and the program that the client is currently displaying including, but not limited to, the IP address or other Layer 2 address of the client, the MAC or other Layer 3 address of the client, the identifier of the client's PRIZM cluster, ZIP or ZIP+4 code, current program being viewed, channel, time, etc. The ADS 104 uses the information in the avail request to select one or more advertisements that the ADM 120 should instruct the video server 132 to play in response to the NDVR avail. The ADS 104 returns one or more unique identifiers to the ADM 120, which the ADM 120 uses to identify advertisements in the content storage 122 that the video server 132 is to play back in response to the NDVR avail; the identified advertisements are used as a part of a playlist. As is explained in greater detail herein, the ADM 120 does not provide the ADS 104 or any other third party with any personally identifiable information in violation of Federal law, e.g., 47 U.S.C. §551, et seq.

In addition to transmitting a request to the ADM 120 for an advertisement in response to an NDVR avail, the video sever 132 informs a reporting system 130 that it is about to play an advertisement in response to an NDVR avail. As the video server 132 begins playing the advertisement, the reporting system 130 is in communication with the video server 132 over the communication bus 126 to trap for any subsequent commands that the client is transmitting to the video server. Put another way, the reporting system is observing the video server to determine and record what percentage of a given advertisement that the video server is playing for the client in addition to any "trick play" control commands, e.g., fast forward and rewind, that the user may issue during the playback of a given piece of content.

The reporting system 130 also collects information regarding the client including the IP address or other Layer 2 address of the client, the MAC or other Layer 3 address of the client, the identifier of the client's PRIZM cluster, ZIP or ZIP+4 code, current program being viewed, channel, time, etc. The reporting system 130 maintains the client viewing information in a data store, such as a relational database, which it may analyze across a number of clients for a given advertisement, over a set of advertisements from a given advertiser 136 or according to other well-known permutations. This information is owned by the NDVR control center, which is responsible for determining what information is stored; according to one embodiment only aggregate data is compiled and released for verification and analysis purposes.

The reporting system 130 may transmit various combinations of raw and processed aggregate viewing information to both programmers 102 and advertisers 136 as defined by their business relationships. The reporting system 130 provides advertisers with a wide amount of information regarding the number of advertisements that they are delivering and the percentage of those advertisements that clients are watching, in addition to the manner in which they are being viewed. In this manner, advertisers can enter into agreements with the operator of the NDVR control center 134 to allow for compensation for providing advertisements in response to NDVR avails, which may be based on the number of avails fuilfilled, the percentage of an advertisement that clients actually watch, or other metrics that the reporting system 130, programmer 102 or advertiser 136 calculate from the data that the reporting system 130 is collecting. Accordingly, programmers 102 may also use this information as an input to the campaign management tool 106 to gauge the effectiveness of a given campaign. It should be noted, however, that the reporting system 130 is designed to provide only aggregate information to third parties and not specific information regarding the viewing habits of a given client.

According to an alternative embodiment of the invention, the video server 132 requests the generation of a playlist when a client requests a program. The playlist is a listing of content that the ADM 120 arranges as a single entity or data structure. The video server 132 sends the playlist request to the ADM 120 for the determination of the number of and selection of pause and bumper advertisements, e.g., NDVR avails. The ADM 120 selects an appropriate ADS 104 that applies one or more algorithms to select one or more advertisement identifiers to fulfill a number of anticipated NDVR avails. On the basis of the advertisement identifiers that the ADM 120 receives, it constructs a playlist that comprises references to the NDVR advertisements that the ADS 104 selects in conjunction with the program that the client requests. The ADM 120 may have several specialized ADS systems that are used to select default advertisements or local advertisements based on previously defined schedules or lists of assets. The ADM 120 returns the playlist to the video server, which uses the playlist as a reference as to the content that it should transmit in response to a given control command from a client. For example, when the client transmits a pause control command to the video server 132, the client 140 selects a pause advertisement from the metadata 800 for presentation to the client. The client will typically play the pause ads and teasers in order without performing any demographic or other advertisement selection.

Each client 140 utilizing the functionality of the NDVR control center 134 has a physical interface for connecting to the distribution network 138, e.g., a coaxial connection. Typically, the client device 140, which may be embodied in a set top box or set top terminal, contains a programmable microprocessor 142 for executing program code that a user loads via an input/output ("I/O") interface 146 or that the client 140 receives over the distribution network 138. The I/O interface consists of both the physical and software I/O functionality that the client 140 provides, for example, a coaxial interface to the distribution network 138, and infrared interface for receiving signals from a remote control 150, a smartcard reader for reading and writing to smartcard media, etc. The client 140 also maintains a codec 148 for decoding audio and video data that it receives form the NDVR control center 134 via the distribution network 138. As is well know to those of skill in the art, the client 140 may implement the codec 148 in hardware or as software that the storage component 144 maintains. Furthermore, the storage component 144, in addition to storing software, may provide storage for video content, such as advertisements, audio and still image data.

One embodiment of the high-level control flow between a client and the NDVR control center is illustrated in the swimlane diagram of FIG. 1A. The process generally begins with a user interacting with the client terminal via a remote control device to initiate a given program, step 152. The NDVR control center receives the request from the client to initiate the program, causing it to retrieve one or more pieces of advertising content or pointers to the location of one or more pieces of advertising content, step 154. The NDVR control center uses the advertising content to satisfy one or more avails, either those present in a program, for example, local advertising opportunities, or those created by a user action such as presenting a pause advertisement in response to the user issuing a pause command.

The NDVR control center builds a playlist to control the video that is part of the program, e.g., the client requested program and one or more pieces of advertising content, step 156. As is explained in greater detail herein, the playlist is a listing of content that the NDVR control center uses to control the specific video that it delivers to clients in response to control commands that the client generates. The encoded content is delivered to the client, step 158, which is decoded by the client's audio and video decoding component for display on a display device, step 160. As the NDVR control center delivers encoded content, it marks the Network Play Time (NPT) point in the playlist for the video that it is delivering at any given time. As the client decodes and displays video on the display device, e.g., the client watches the program, a routine continually listens for program control signals from the client that the user executes to control the manner in which is video is displayed, step 162, for example, pause, rewind, advance, etc.

Program control at the NDVR control center forks depending on the specific command that the user issues to the client. Where the client issues rewind or fast forward control command, steps 164 and 166, the video rewinds or advances at an accelerated rate, step 180, and the content is delivered to the client for decoding and display, steps 158 and 160. When the user issues a subsequent play command, step 172, the video returns to the normal playback rate, which is delivered to the client for decoding. Similarly, where the client issues a restart control command, step 168, the video advances to the NPT start point in the playlist for the program from which point the NDVR control center delivers the content for decoding and display. Depending on the embodiment, the client may store the NPT index and pass the index to the video server with the control command.

According to one embodiment, where the user issues a pause control command, step 170, the NDVR control center or client advances to or requests playback from the NPT point of a given advertisement for display as a pause advertisement, step 184. The client, in turn, displays a pause screen graphic on the display device, step 186. For example, the pause screen graphic may include instructions that tell the user to hit an "A" key on the remote control to view the pause advertisement and the play key to restart the program. Depending on the instructions that the client issues, the program either continues or the pause advertisement is played.

The NDVR control center also traps for other functionality that the system offers. For example, where the NDVR control center receives a camera angle control command, step 174, it advances to the NPT point in the playlist that contains or points to a program's alternate camera angle video, step 188, which it delivers to the client for decoding and display. Similarly, where the NDVR control center receives other control commands, step 178, it advances to the NPT point that contains or points to video content that is responsive to the received control command, step 190. The NDVR control center delivers content from the new NPT point, which the client decodes and displays, steps 158 and 160. Alternatively, the client may have one or more well known or preconfigured NPT indexes and request the video server playback from a given NPT index upon receipt of a given control command. It should be appreciated by those of skill in the art that according to the program flow of FIG. 1A, although presented in the context of a client accessing a remote NDVR control center, one could easily implement both components in a single device, such as in a set top box or terminal.

Figure 2:
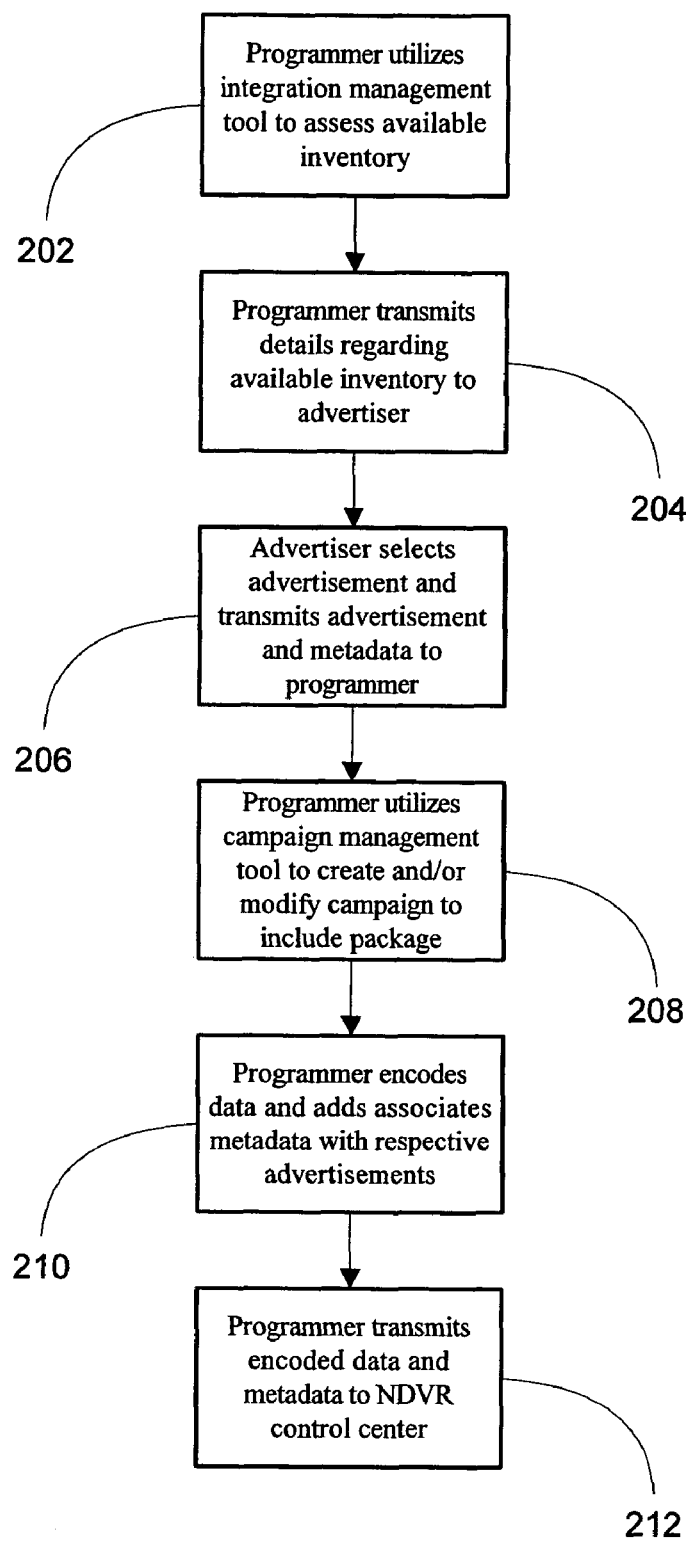
FIG. 2 is a flow diagram presenting a technique for national advertisement integration according to one embodiment of the present invention.

FIG. 2 presents one embodiment of a process for utilizing the advertiser and programmer components of FIG. 1 to perform integration of advertisements within a program. A programmer utilizes an integration management tool to assess advertisement inventory available within a given demographic, step 202. Programs are typically broken into one or more chapters or segments whereby the programmer may insert commercials or other advertisements between the one or more chapters, referred to as avails. Alternatively, a programmer may insert real or placeholder advertisements that may or may not be replaced or added to by the ADM. The programmer transmits details regarding the available advertisement inventory to the one or more advertisers, step 204.

The advertiser examines the program details and the number and placement of the avails within the program and expected demographics of the viewers to select advertisements, step 206. The advertiser employs one or more algorithms to analyze the relative value of the program vis-à-vis other potentially available programs. The advertiser may also analyze the placement of the available inventory to calculate the value of each avail, e.g., avails in the middle of a program are potentially more valuable than avails at the end of a program when viewers tend to tune away from the program. The advertiser selects one or more advertisements to fulfill avails within a program and transmits the advertisement and metadata describing the advertisement to the programmer, step 206.

The programmer creates or modifies a campaign for a given program to include advertising, step 208. According to one embodiment, as the programmer receives advertising from advertisers to fill given avails, the programmer inserts the advertisement into the avail. The programmer may use digital video splicing tools that are well known to those of skill in the art of splice the advertisement to the program, thereby creating one continuous data stream. Alternatively, the programmer waits for advertisements to come in from a plurality of advertisers or all advertisers fulfilling avails for a given program before splicing the advertisements into the program. At some point during splicing the advertisements into the program, the programmer inserts cues that a video server or similar distribution system interprets as indicating a break in a program for presentation of an advertisement. One embodiment of these cues is promulgated by the Society of Cable Telecommunications Engineers ("SCTE") under American National Standard ANSI/SCTE 35 2001 (Formerly SCTE DVS 253), entitled "Digital Program Insertion Cueing Message for Cable" (May 8, 2001), herein incorporated by reference in its entirety. Programmers may also implement other cuing techniques known to those of skill in the art.

The programmer encodes the program and its advertisements for transmission over a distribution network and associates metadata with respective advertisements, step 210. Programmers may apply any number of video encoding techniques to the program. Typically, programmers encode their programs according to the MPEG2 compression standard. The SCTE defines one exemplary encoding technique for digital video transmission over cable networks under American National Standard ANSI/SCTE 07 2000 (Formerly SCTE DVS 031), entitled "Digital Video Transmission Standard for Cable Television", herein incorporated by reference in its entirety. The programmer also associates metadata that it receives from the advertiser with the respective program, thereby allowing the NDVR control center to identify the source and content of individual advertisements for potential advertisement replacement and reordering as is explained in greater detail herein. The NDVR control center receives the encoded program data and metadata from the programmer, step 212. Alternatively, the NDVR control center may acquire content from programmers and advertisers via live transmission, whereby the NDVR control center segments the programming after acquisition.

Figure 3:
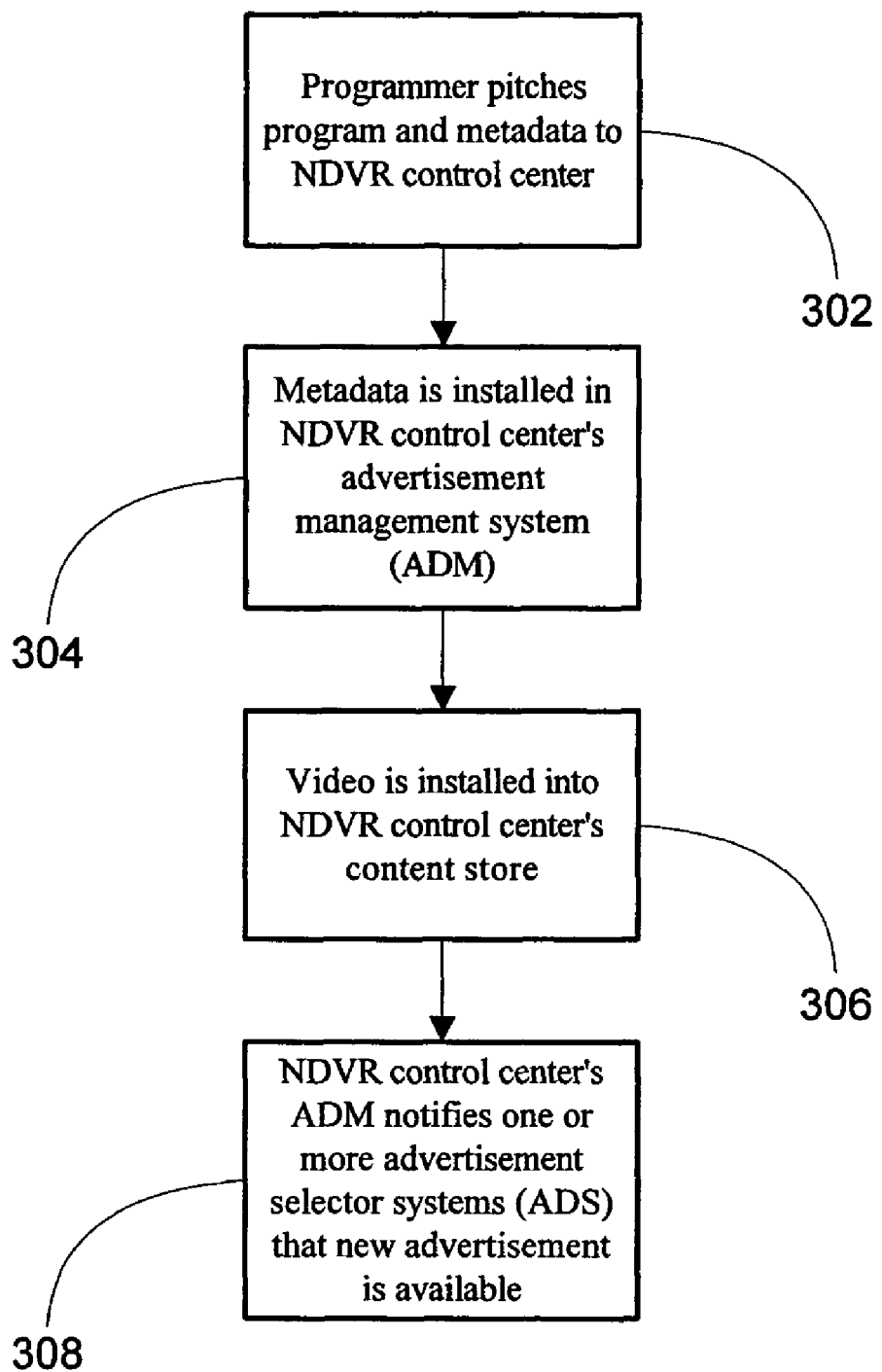
FIG. 3 is a flow diagram presenting a method for national advertisement initiation according to one embodiment of the present invention.

The process of advertisement integration illustrated in FIG. 2 continues with one embodiment of the advertisement initiation process of FIG. 3. According to this embodiment, the programmer and NDVR control center employ a pitcher/catcher mechanism, respectively, to transmit the programming and metadata, step 302. The pitcher/catcher platform typically relies on satellite transmission of content from programmers or advertisers, which operate a pitcher to transmit data, to cable headends, e.g., the NDVR control center, which operate a catcher to acquire data. Other data transmission media may be used to connect programmers with an NDVR control center, such as the public Internet or VPNs. Alternatively, advertisers transmit advertisements and metadata directly to the NDVR control center for satisfaction of NDVR avails that are created in response to user actions, e.g., transmission of a pause command.

The NDVR control center installs the metadata that it receives from the programmer into its ADM, step 304. With the metadata, the ADM is capable of interpreting instructions from both the video server and an advertiser's ADS regarding the proper advertisements to play in response to given commands that the system receives from a client or the need to rearrange or substitute advertisements in a given program. The metadata installation process provides the ADM with intelligence regarding the available advertisements. The NDVR control center also installs video that it receives from both programmers and advertisers into its content storage, step 306, which may comprise any number of storage paradigms, including file systems and relational databases.

The NDVR control center's ADM transmits a notification to the appropriate advertiser's ADS identifying one or more advertisements that have become available, step 308. The ADM examines the metadata that it installs to identify the advertiser that owns the advertisement. Once the ADS receives notification that the advertisement is available for distribution by the ADM via the video server, the ADS may select the advertisement for presentation to the viewer. The ADM and ADS may transmit the notification and presentation instructions over the primary distribution network to which the NDVR control center comprises a connection, e.g., cable network, or a secondary communications network, such as the Internet.

Figure 4:
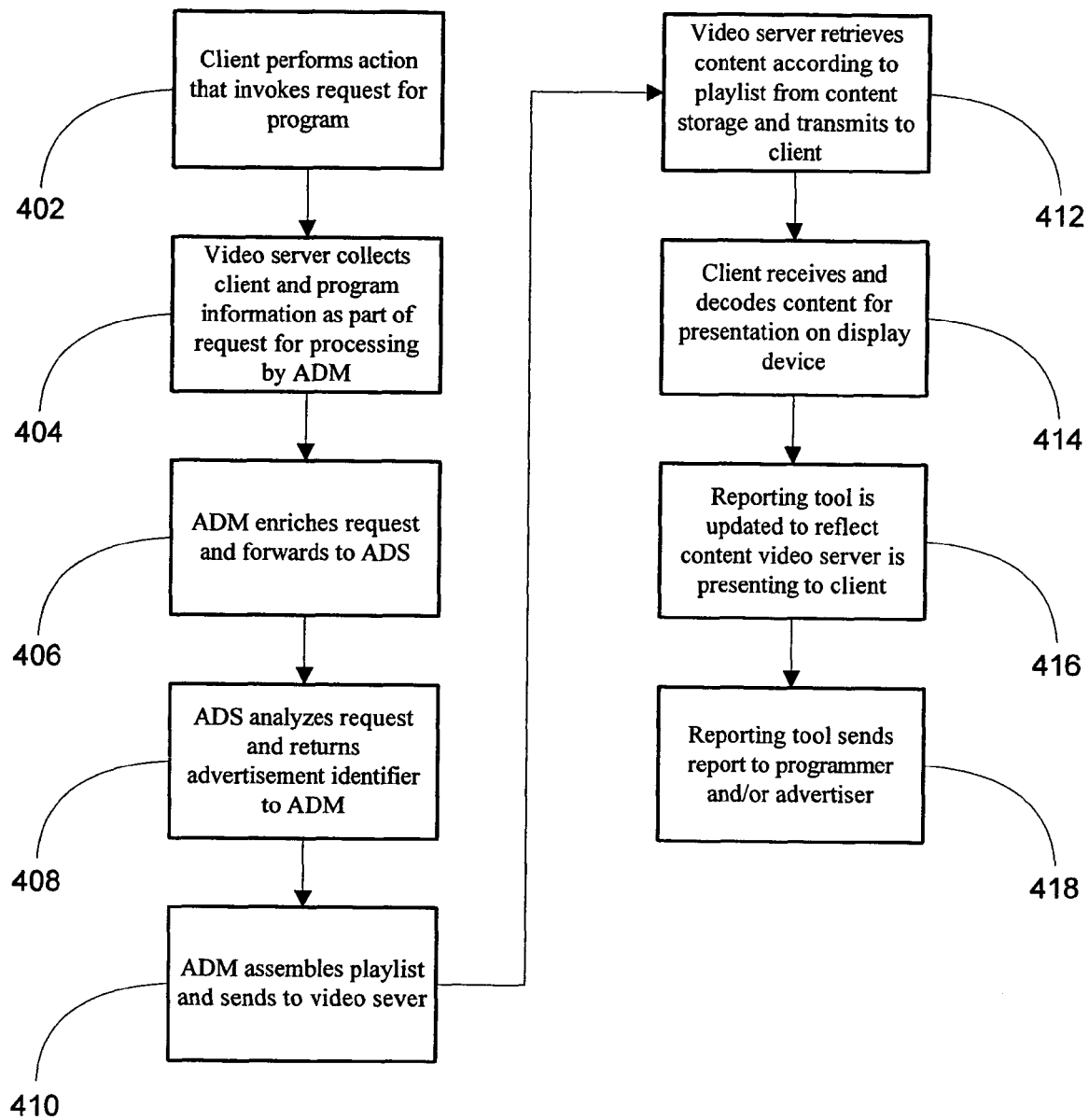
FIG. 4 is a flow diagram presenting a method for national advertisement delivery according to one embodiment of the present invention.

The process continues with FIG. 4, which illustrates one embodiment of a process for delivering programming and advertising to a client. A client performs an action that invokes a request for a program, for example, tuning to a live broadcast or performing playback of a previously recorded program, step 402. In response to the request, the video server that is in communication with the client collects client and program information, which the video server packages as a request for processing by the ADM, step 404. The ADM may, in turn, enrich the request with additional information, step 406, which may include, but not limited to, information identifying the distribution system or network to which the NDVR control center belongs or information that facilitates billing of an advertiser for broadcast of an advertisement or providing the opportunity to do so. According to one embodiment, the ADM analyzes the request from the video server and determines whether advertisements within the program that the client selects are amenable to reordering or replacement. For example, where the client is requesting to view previously recorded programming, it may be advantageous to replace all advertising that forms part of the original broadcast, whereas with recently recorded or programming that is currently broadcasting, contractual or other obligations may prevent the ADM from replacing some or all of the advertising in the program. On the basis of its analysis, the ADM modifies the request prior to transmission to the ADS for advertisement fulfillment.

The ADM determines the number and type of avails, which the ADS analyzes request to determine the proper advertisements that it wants the video server to display to the client, step 408. Accordingly, the ADS can insert multiple advertisements within a given avail to create a section with the appropriate length (or other constraints) of the avail. The ADM provides the ADS with a wealth of information regarding the client and program that he or she is instructing the video server to play. The ADS uses this data to calculate the proper advertisement for the video server to play according to one or more advertisement targeting techniques well known to those of skill in the art, one example of which is the PRIZM system that classifies every neighborhood in the United States in terms of 62 demographically and behaviorally distinct clusters for advertisement targeting purposes. Alternatively, the ADS may target advertisements on the basis of the program into which the ADM is going to insert the advertisement, and not on the basis of the client requesting the program. The ADS returns a set of zero or more advertisements to the ADM to fulfill a given program's avail requirements, step 408.

The ADM concatenates program information and advertisement information into a playlist for transmission to the video server, step 410. As is explained in greater detail herein, the playlist is a listing of content whereby the ADM sets Normal Play Time (NPT) markers to delimit constituent pieces of content within the playlist. According to publicly available RFCs, Normal Play Time is clock that the viewer intuitively associates with a program and which is often digitally displayed on a VCR. The beginning of a presentation corresponds to zero seconds and negative values are not allowed. NPT advances normally when in normal play mode, whereby the scale is equal to one, advances at a faster rate when in fast forward, decrements when in rewind and is fixed when set to pause. According to certain embodiments of the invention, the start NPT in a playlist for a given program may be offset from zero and other content may be inserted in to the playlist between NPT zero and the actual start NPT for the given program, which is particularly useful in conjunction with pause advertisements where the NPT of the pause advertisement is well-known or preconfigured.

The video server receives the playlist from the ADM and retrieves content from the NDVR control center's content storage according to the playlist for transmission to the client, step 412. Those of skill in the art should understand, however, that the video server and the NDVR control center's content storage may be hosted on the same physical device. According to one embodiment, the video server interprets the playlist as a series of pointers to content locations and uses the playlist to determine the proper content to play to a client in response to given control commands that it receives. The client receives content from the video server that is responsive to the control commands that the client is transmitting, which it decodes for presentation on a display device, step 414. As with other embodiments of the invention, either the client or video server can select the NPT playback point in response to a given control command. Where the client selects the NPT point, the client communicates the index to the video server during issuance of the control command.

The video server transmits content in the form of video streams to the client for decoding and the reporting tool observes and records the substance of the content, step 416. According to one embodiment of the invention, the reporting tool has access to content metadata or client information. The reporting tool uses these and other data to calculate or process aggregate viewing statistics. For example, the reporting tool may calculate aggregate statistics regarding viewers, the percentage of given programs or advertisements that viewers are watching, etc. Alternatively, or in conjunction with processed data, the reporting tool may transmit raw data or portions thereof directly to programmers and advertisers for third party analysis, step 418.

Figure 5:
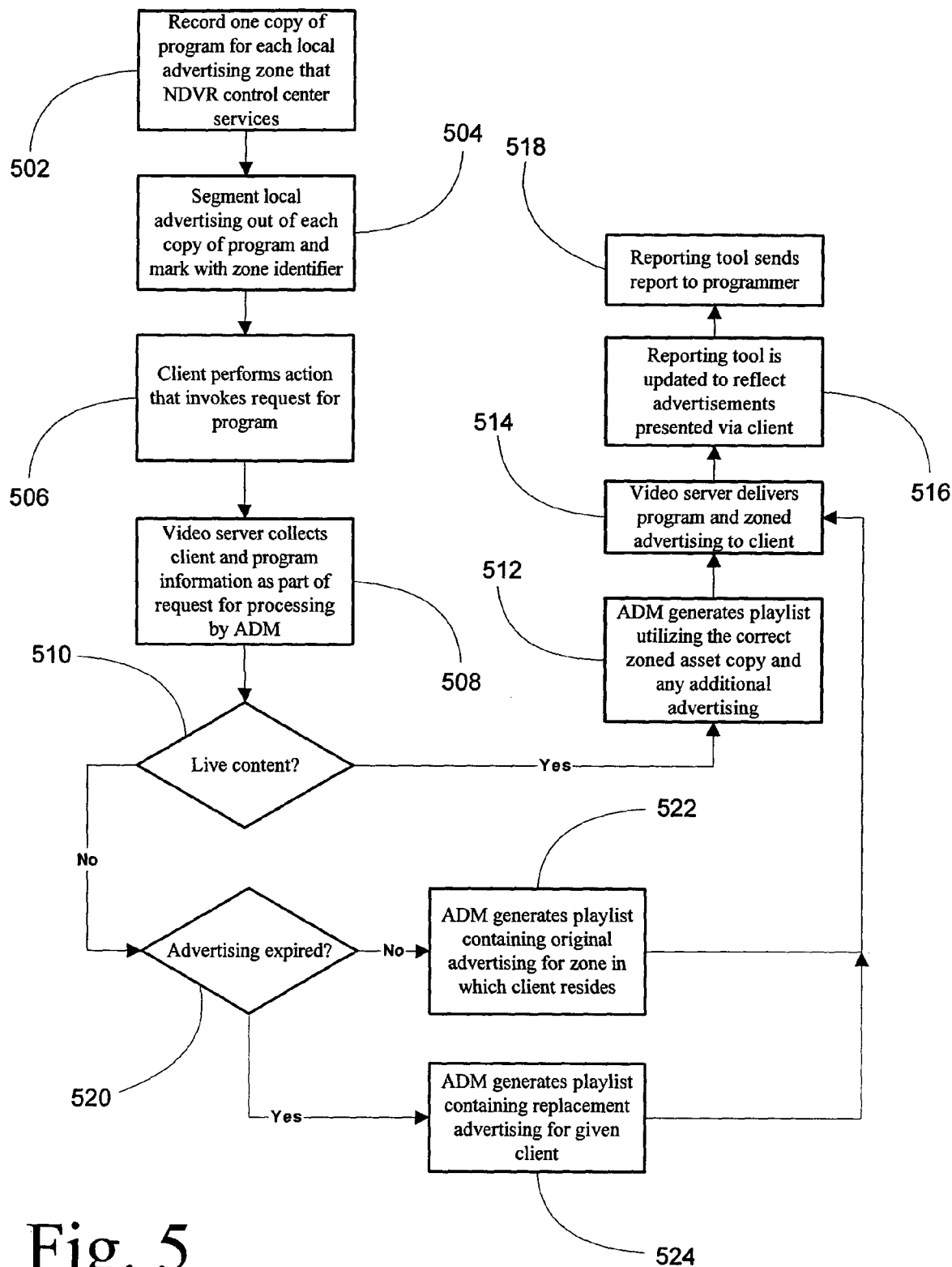
FIG. 5 is a flow diagram presenting a method for local advertisement delivery according to one embodiment of the present invention.

Because local advertisers purchase avail opportunities for only one or more local advertisement zones, a method is needed to ensure that the NDVR control center delivers programming with the proper local advertising to a client in a given zone. FIG. 5 illustrates one such embodiment of a method for delivering programming with local advertising. As the NDVR control center receives programs with local advertising, it records one copy of the program for each zone that it services, step 502. The NDVR control center may segment local advertising out of each copy of the program, or it may segment one feed and store additional zoned feeds in an unsegmented state, which it marks with a zone identifier, step 504. The invention may implement one or more methods for determining where to insert the local advertising. Indications for local advertising insertion may consist of SCTE 35 cue packets, DTMF cues in an analog system, contact closures that an analog signal triggers, contact closures from an analog insertion system, network messages from an insertion system indicating the time of insertion, network message from a stat-mux/splicer device indicating the time of insertion and imbedding segmenting messages in the network digital video stream.

While watching live programming or requesting time shifted programming, the user transmits an instruction to the client or otherwise performs an action that invokes a request for a stored program or program currently being acquired by the NDVR control center that contains local advertising, step 506. The video server collects the client and program information as part of a programming request for processing by the ADM, step 508. The ADM receive the request and performs a check to determine whether the user is attempting to view live content, step 510. Where the user is attempting to view live content, the ADM generates a playlist that identifies the client requested program that includes the correct local advertising for the program that is tagged with a zone identifier matching the zone in which the client resides, step 512. The ADM returns the playlist to the video server, which delivers the program with the properly zoned local advertising to the client for decoding and display, step 514. The reporting tool also receives an indication of the advertisements that the video server is delivering to the client, which it uses to update its records to reflect the advertisement delivery, step 516. At periodic intervals, the reporting tools send reports to the appropriate programmers and advertisers to provide aggregate viewing statistics for programming and advertisements, step 518.

Returning to step 510, where the ADM determines that the client is requesting time shifted content, e.g., content that has been previously recorded, step 510, the ADM performs an additional check to determine if the local advertising that is part of a program is expired or otherwise replaceable, step 520. The ADM may determine whether an advertisement is expired according to a number of techniques known to those of skill in the art. For example, each advertisement is associated with advertising metadata that describes various characteristics of the advertisement and may contain an expiration value that the ADM queries to determine if a given local advertisement is expired and is therefore amenable to replacement. The ADM may also use a rights manager and/or database for the given network or program that may instruct the ADM to either always or never replace advertising in this program.

Where the local advertising within a program has not expired, step 520, the ADM generates a playlist containing the original local advertising for the zone in which the client resides, step 520. The ADM also may utilize a local ADS that reads the original schedules to reinsert the correct local advertisements. The ADM delivers the playlist to the video server for delivery to the client of the program and advertising that the playlist identifies, step 514. Alternatively, where the ADM determines that the local advertising within a program has expired, step 520, the ADM generates a playlist containing replacement advertising according to one or more of the advertisement targeting techniques discussed herein, step 524. The ADM delivers the playlist to the video server for delivery to the client of the program and advertising that the playlist identifies, step 514.

Figure 5A:
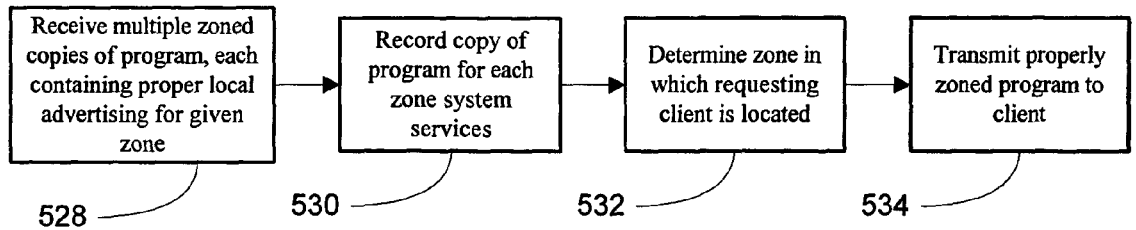
FIG. 5A is a flow diagram presenting a method for delivering properly zoned local advertising when viewing live or near live programming according to one embodiment of the present invention.

Other embodiments of the invention that contemplate alternative methods for the delivery of local advertising are presented in FIGS. 5A through 5D. Turning to FIG. 5A, one embodiment of providing properly zoned local advertising when a client is viewing live or near live programming in an NDVR environment includes receiving multiple zoned copies of a program at the NDVT control center wherein each copy contains the proper local advertising for a given zone, step 528. The NDVR control system records a copy of the program for each of the local zones that the system is servicing, step 530. Clients requesting a given program must receive the proper recording of the program for the zone that they reside in, e.g., a viewer located in zone one must receive the program recorded for zone one and therefore contains the proper advertising for zone one. To accomplish this, The NDVR control center determines the zone in which the requesting client resides, step 532, and transmits the appropriate local zone copy of the program that the client is requesting, step 534. In this manner, the NDVR control center maintains a copy of a given program for each zone that the NDVR control center services.

Figure 5B:
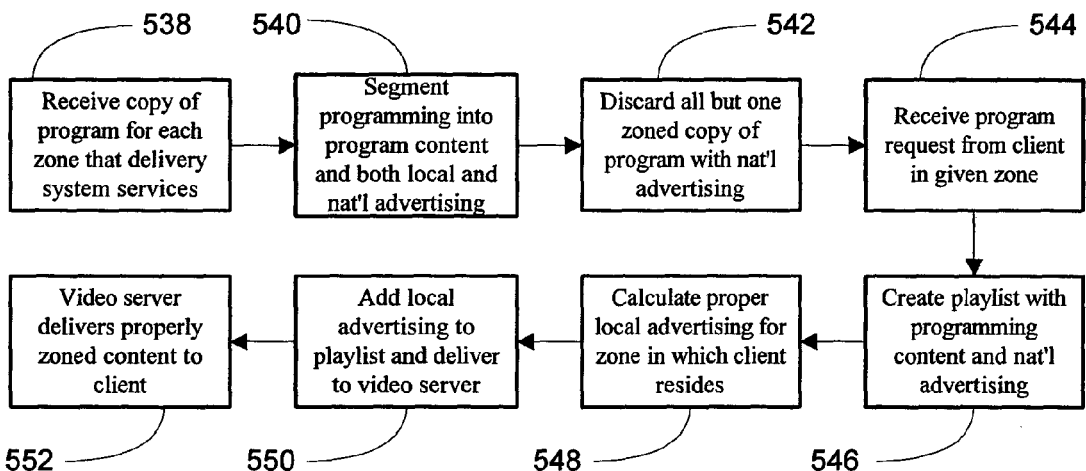
FIG. 5B is a flow diagram presenting a method for delivery properly zoned local advertising when viewing recorded programming according to one embodiment of the present invention.

An embodiment of the invention for delivering programs with properly zoned local advertising in recorded programming is illustrated in FIG. 5B. According to this embodiment, the NDVR control center receives a copy of a given program for each zone to which the NDVR control center provides programming, step 538. Components at the NDVR control center segment the received programming into programming content, local advertising and national advertising, step 540, discarding all but one copy of the programming content and national advertising, step 542, and storing the local advertising acquired from the live feed in a content storage device.

Components at the NDVR control center, e.g., video server, wait to receive a request from a client in a given zone to deliver a program, step 544. In response, a playlist is created that identifies the programming content that the client is requesting and the national advertising contained within the program, step 546. The ADM, in conjunction with one or more ADS systems, calculates the proper local advertising to select for the zone in which the requesting client resides, step 548. The playlist created in step 546 is updated to reflect the identifiers for the selected local advertising, which is delivered to the video server, step 550. The video server, in turn, delivers the properly zoned content to the requesting client for decoding and display, step 552.

Figure 5C:
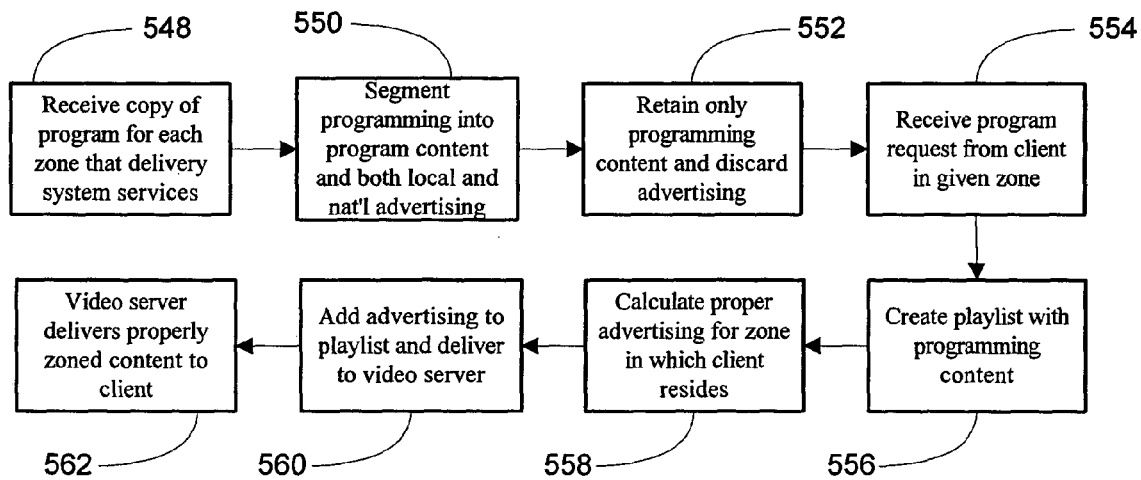
FIG. 5C is a flow diagram presenting an alternative method for delivering properly zoned local advertising when viewing recorded programming according to one embodiment of the present invention.
Figure 5D:
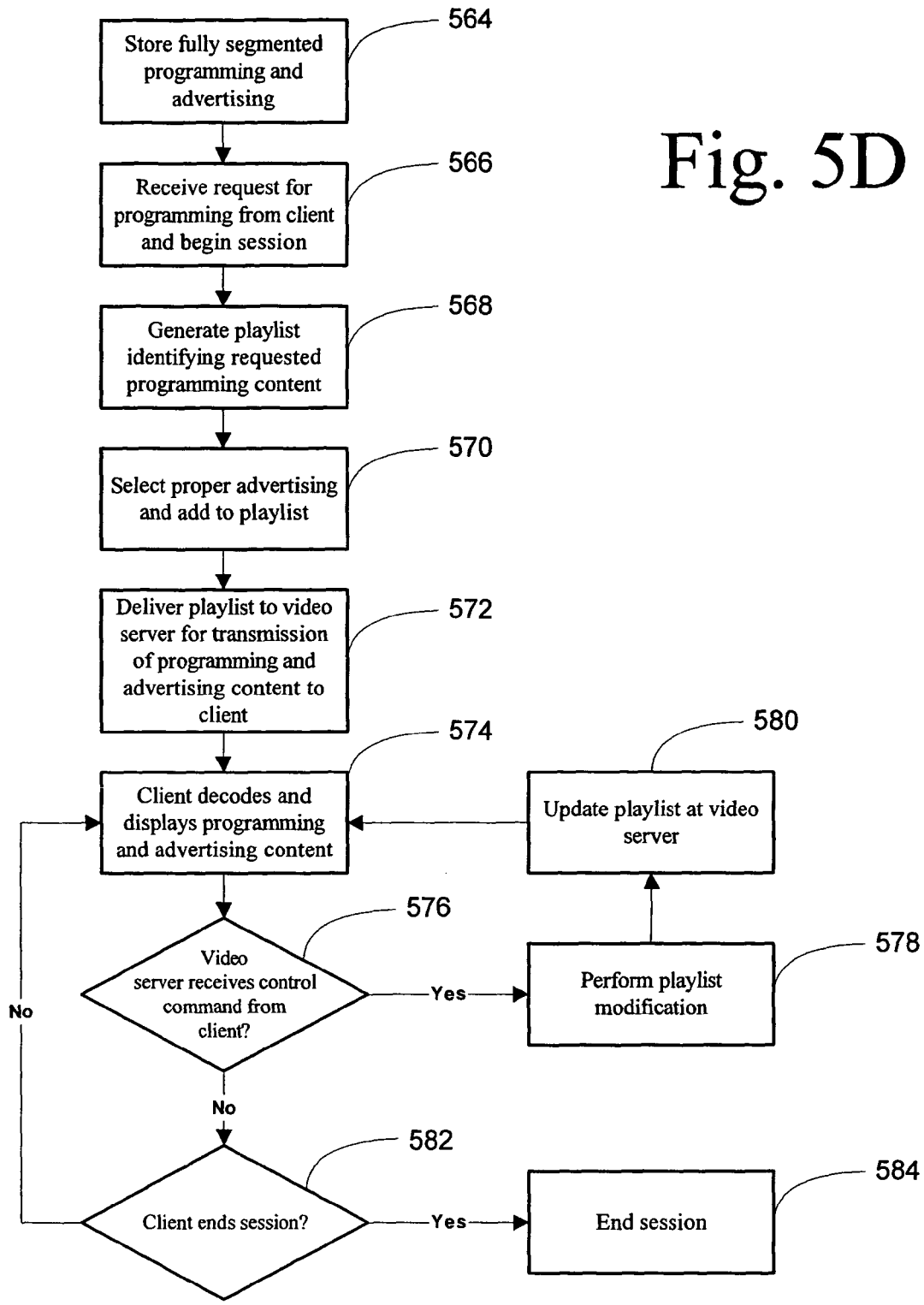
FIG. 5D is a flow diagram presenting a method for generating dynamic playlists for the dynamic delivery of advertising according to one embodiment of the present invention.

An alternative embodiment to that presented in FIG. 5B for delivering programs with properly zoned local advertising in recorded programming is shown in FIG. 5C. According to this embodiment, the NDVR control center receives a copy of a given program for each zone to which the NDVR control center provides programming, step 548. Components at the NDVR control center segment the received programming into programming content, local advertising and national advertising, step 550, discarding all but one copy of the programming content, step 552. As opposed to the methodology of FIG. 5B, the present embodiment does not acquire advertising from the live feed. Instead, advertising is acquired from one or more ADS systems registering with the NDVR control center's ADM and delivering advertising content for storage in the system's content storage.

Components at the NDVR control center, e.g., video server, wait to receive a request from a client in a given zone to deliver a program, step 554. In response, a playlist is created that identifies the programming content that the client is requesting, step 556. The ADM, in conjunction with one or more ADS systems, calculates the proper advertising to select for the zone in which the requesting client resides, step 558, e.g., determines which advertisements were at which point in the original live broadcast of the program. The playlist created in step 556 is updated to reflect the identifiers for the selected advertising, which is delivered to the video server, step 560. The video server, in turn, delivers the properly zoned content to the requesting client for decoding and display, step 562.

In addition to generating playlists for transmission to a video server, which interprets the playlist to determine the proper content to deliver to a viewer in response to control commands that it receives, functionality is provided for altering a playlist after is has been delivered to the video server, so called "dynamic" playlists. One embodiment of a method for utilizing a dynamic playlist is presented in FIG. 5D. The NDVR control center stores fully segmented programming and advertising on a content storage device, e.g., hard disk, RAID array, Storage Area Network ("SAN"), Network Attached Storage ("NAS"), etc., step 564.

When the NDVR control center's video server receives a control command from a client to initiate delivery of a given program, the video server begins a new delivery session, step 566. When a new session begins, the NDVR control center generates a playlist that contains information identifying the program that the client is requesting, step 568. The ADM is responsible for inserting advertising content, e.g., bumper, pause and replacement advertising, into the playlist. The ADM contacts one or more registered ADS to select advertising to accompany the program content, step 570, which causes the one or more ADS to return one or more advertisement identifiers that uniquely identify advertisement content that the NDVR control center maintains in its content storage for inclusion in the playlist. The ADM delivers the playlist to the video server for transmission of the programming content and one or more advertisements identified in the playlist to the client, step 572.

The client receives the video data from the video server and proceeds to decode and display the programming and advertising content, step 574. The video server awaits receipt of a control command from the client, step 576, or another signal indicating that the client is ending the session, step 584. When the video server receives a session end signal from the client, step 584, the current session ends, step 586, and program flow returns to step 566 wherein the video server receives a subsequent control command from the client to initiate delivery of a given program, causing the video server begins a new delivery session. It should be understood that where a session ends due to the client powering down, the exemplary delivery process of FIG. 5D terminates.

Where both checks fail, steps 576 and 584, e.g., the viewer is simply continuing to watch the requested program, the client accordingly continues to decode and display the data it is receiving from the video server, step 574. If the video server receives a control command from the client, step 576, a check is performed to determine if the received command required modification of the playlist, step 578. For example, where the control command that the client transmits indicates a pause control command, the NDVR system may examine a number of factors to determine if the pause data (pause or pause teaser advertisements) indicated in the playlist should be dynamically replaced with alternative pause data. Factors that the system may use to determine if playlist modification is advantageous include, but are not limited to, client state, time of day, selected demographic information regarding the current viewer, recent viewing history, etc. Similarly, the system may simply determine that it would advantageous, on the basis of a number of current factors, to replace an upcoming advertisement interspersed within the requested program, whereby program flow proceeds directly to step 578, bypassing steps 576 and 584.

When playlist modification is indicated, step 578, the playlist previously received by the video server is updated to reflect the new advertisement information, step 580. The structure of the playlist is discussed shortly in greater detail. As the playlist now contains updated information, the video server prepares the video data associated with the new information in the playlist for transmission to the client, which the client decodes and displays to the viewer, step 574. Alternatively, a new playlist for the client's current session may be generated at step 580, whereby program flow proceeds to step 572 and the new playlist is delivered to the video server for replacement of the previous playlist. Where the video server receives a control command, step 576, and the check at step 578 indicates that playlist modification is not required, the video server executes the control command, step 582, passing the appropriate video data to the client for decoding and display, step 574.

Figure 6:
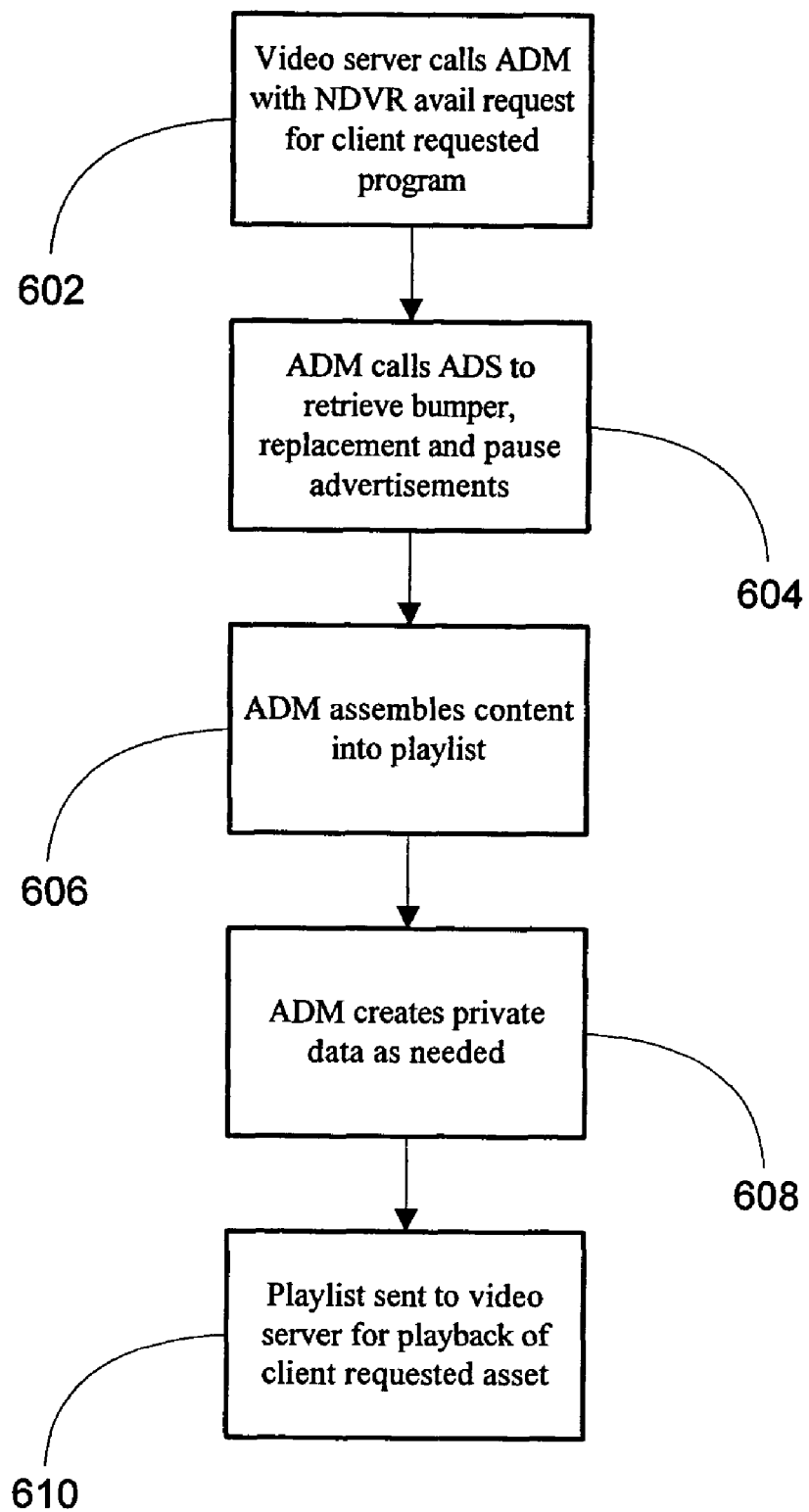
FIG. 6 is a flow diagram presenting a method for playlist generation according to one embodiment of the present invention; (602 another video sever, needs an R)

As indicated above, certain embodiments of the system and method of the present invention rely on the playlist data structure to instruct the video server as to the proper content to transmit to the client. FIG. 6 presents one embodiment of a method for creating a playlist. When the client requests a program, the video server calls the ADM with the program asset requesting that the ADM either find or create avails and provide advertisements to fulfill NDVR avails for the program the client is requesting, step 602. The video server includes information regarding the program and client, which the ADM may enrich. The ADM calls the ADS for the advertiser associated with the program or who has purchased NDVR avails to retrieve bumper, replacement and pause advertisements, step 604.

The ADM receives advertisement identifiers for bumper, replacement and pause advertisements and assembles the playlist, which also includes a reference to the client requested program, step 606. In creating the playlist, the ADM also creates private data typically to be transmitted to the client for the purpose of identifying the NPT indexes with respect to pause ads and to index or otherwise segment the playlist, e.g., identifying different content segments of the playlist according to the given segment's distance from the start of the play list in NPT units. The ADM may also add any additional private data that the video server or other components of the system require, step 608. The video server receives the playlist and begins playback of the content within the playlist, step 610, which may start at any point in the playlist, for example, at the NPT point of a bumper advertisement prepended to the client requested program or at the NPT point of the beginning of the client requested program. FIGS. 7 through 10 illustrate different embodiments of playlists and data contained therein.

Figure 7:
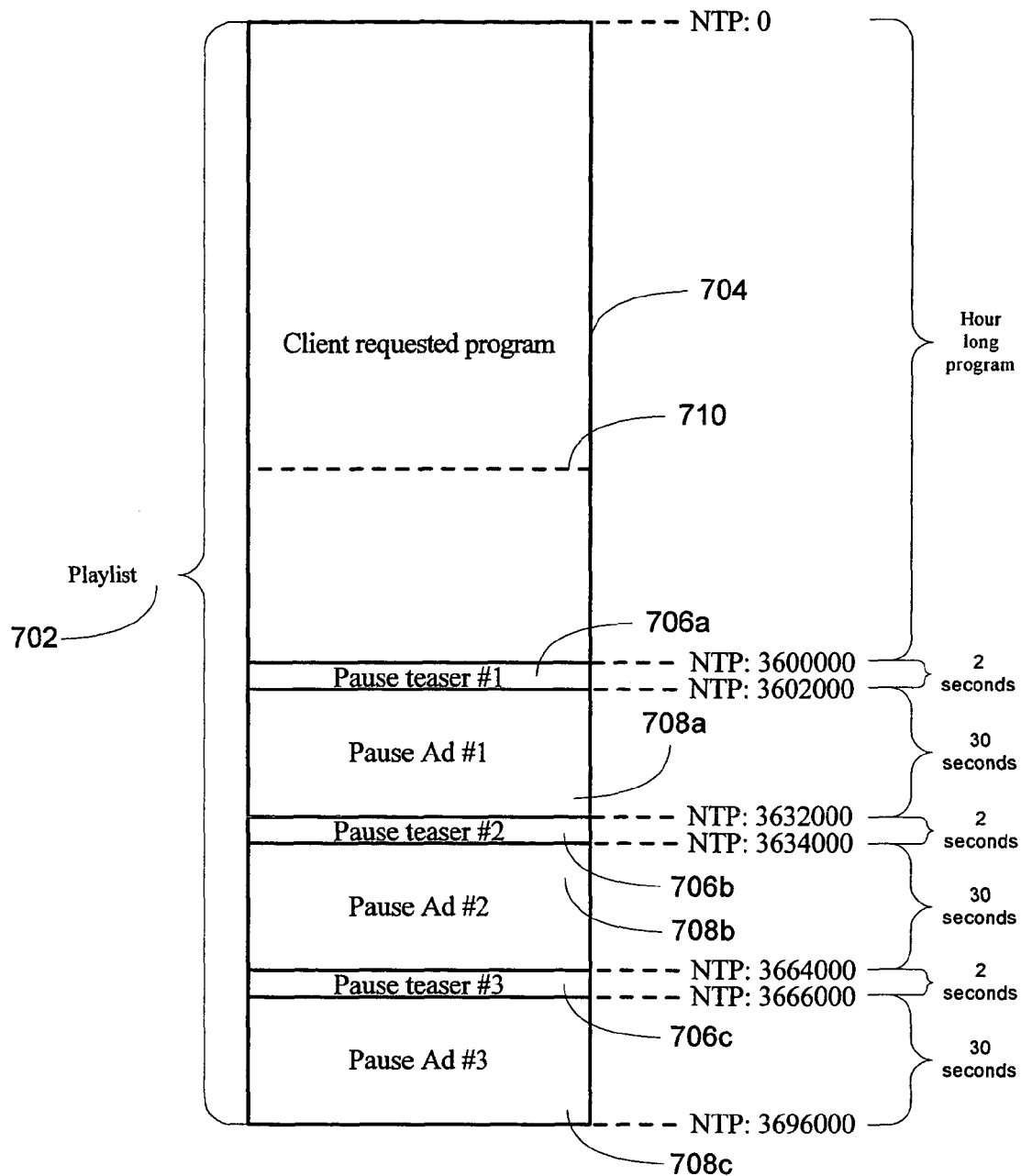
FIG. 7 is a block diagram presenting a pause advertisement playlist according to one embodiment of the present invention.

FIG. 7 presents one embodiment of a playlist. This playlist 702 consists of a client requested program 704, a number of pause teaser advertisements 706a, 706b and 706c, which are essentially advertisements for advertisements. In other words, the pause teaser advertisements present the viewer with an indication or a "teaser" of the advertisement with which it is associated. In addition to a number of pause teaser advertisements 706a, 706b and 706c, the playlist also contains a number of pause advertisements 708a, 708b and 708c that are associated with the pause teaser advertisements. Furthermore, it should be noted that the playlist can contain any number of types of additional advertising content that the video server may present in response to a control command that it receives from a client or that may be presented as part of an NDVR system.

The video server retrieves the client requested program 704 and begins transmitting the data starting at NPT 0 or a requested NPT index. When the video server receives a control command indicating that the client is requesting a pause, the video server marks the NPT pause point 710 in the client requested program and jumps to an appropriate pause teaser, e.g., 706a, for presentation to the client. While this particular playlist defines pause teaser advertisements of two seconds in length, pause teaser advertisements may be any desired length, including varying lengths for different pause teaser advertisements. As with other embodiments either the client or video server can mark and pass the NPT index.

Figure 8:
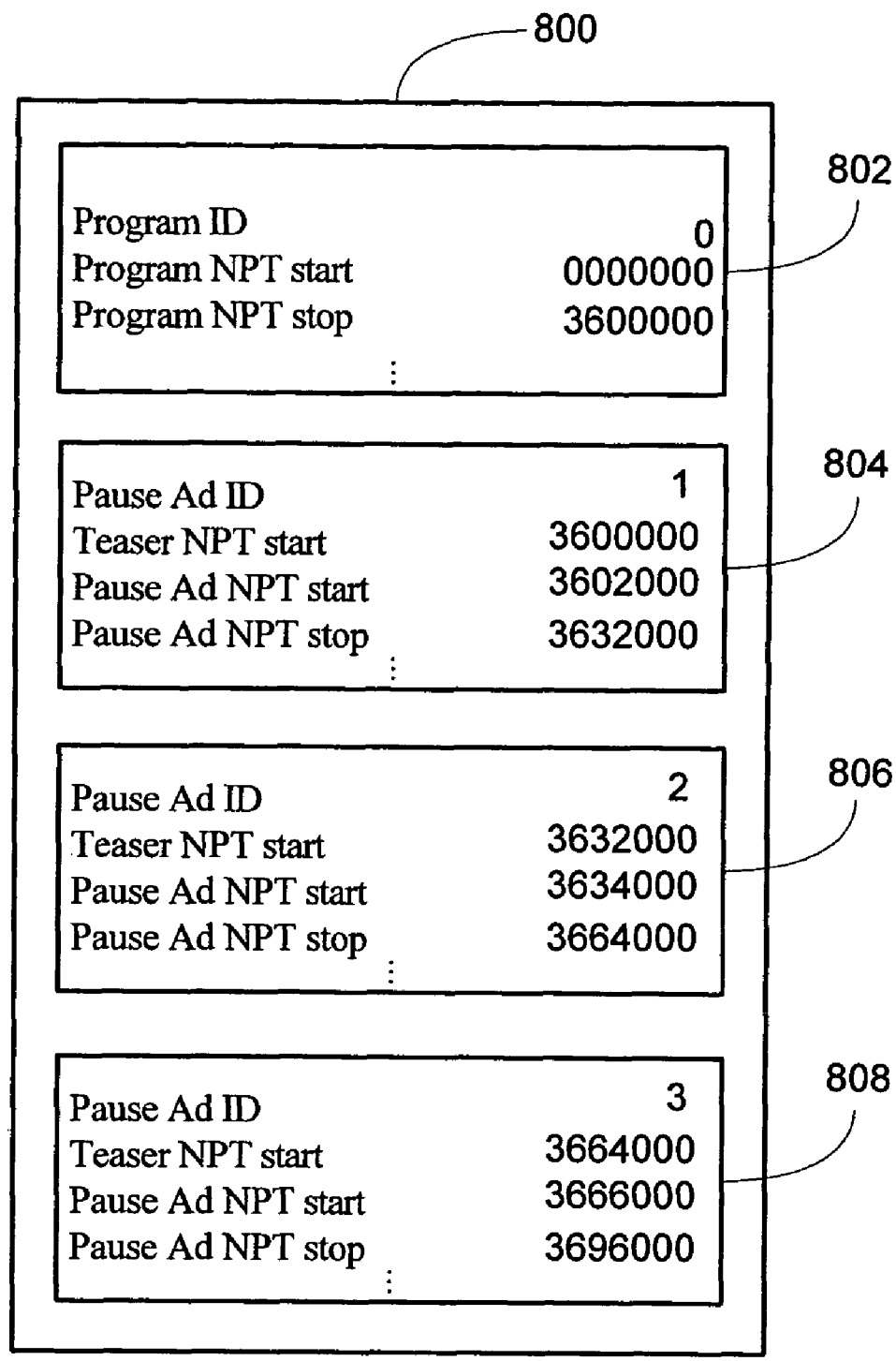
FIG. 8 is a block diagram presenting pause advertisement descriptor information according to one embodiment of the present invention.

An alternative illustration of a playlist is presented in FIG. 8. The data structure 800 is of sufficient size to accommodate all data that the playlist contains. As with the playlist of FIG. 7, the data structure 800 is segmented into a number of sub-structures to store information regarding the client requested program 802 and a plurality of pause advertisements 804, 806 and 808. Although the data within the playlist 800 reflects only a program or pause advertisement identifier and a respective NPT point in the playlist, the data may be far more comprehensive including, by way of example, channel, ownership and program address information.

The ADM creates the playlist 800, which the video server uses to identify the location of the program in the NDVR control center's storage facility and the relative arrangement of the content 802, 804, 806 and 808 that comprises the playlist 800. When the client generates a pause command while watching a requested program, the video server or client marks the NPT pause point in the client requested asset, e.g., an NPT time between zero and 3,600,000, selects a proper pause advertisement 804, 806 and 808 and issues an LSCP command to play the pause teaser or pause ad depending on the given implementation. According to one embodiment, the video server maintains session variables for each client to maintain client state, including the number of pause advertisements that have been accessed during a given program. For example, when the client initially issues a pause control command, the video server accesses the data for the first pause advertisement 804, playing back the pause teaser and awaiting a further command from the client prior to performing playback of the pause advertisement in its entirety. Accordingly, subsequent pause commands from the client result in the video server delivering subsequent pause teasers and advertisements 806 and 808. This information can also be stored by the client and retrieved at the close point of a session.

Figure 9:
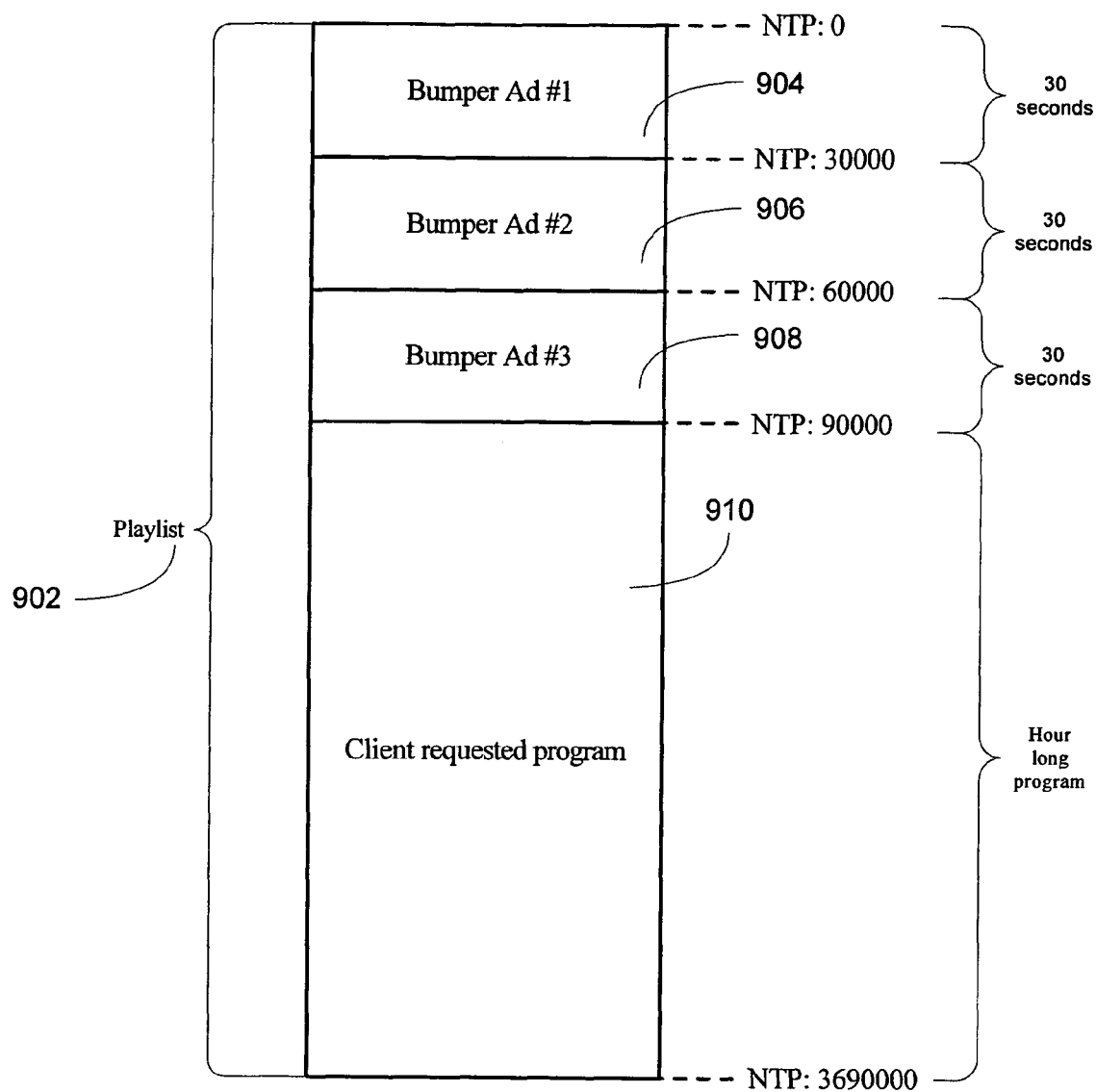
FIG. 9 is a block diagram presenting a bumper advertisement playlist according to one embodiment of the present invention.

FIG. 9 presents a bumper advertisement playlist. The playlist 902 comprises a variable number of bumper advertisements 904, 906 and 908 that are prepended to a client requested program 910. According to the playlist of FIG. 9, each bumper advertisement 904, 906 and 908 is thirty seconds in length, although it should be understood by those of skill in the art that additional bumper advertisements and bumper advertisements of longer or variable length may be prepended to the client requested program 910. The bumper advertisements 904, 906 and 908 provide additional avail opportunities in an NDVR environment, e.g., additional exposure of clients to advertising when viewing network recorded programming. As is explained in greater detail herein, it should be understood by those of skill in the art that bumper advertisement may be appended, as well as prepended, to a client requested program 910 depending on whether the client is requesting a program that is completely recorded or a program that is currently in progress, e.g., a "near live" broadcast.

Figure 10:
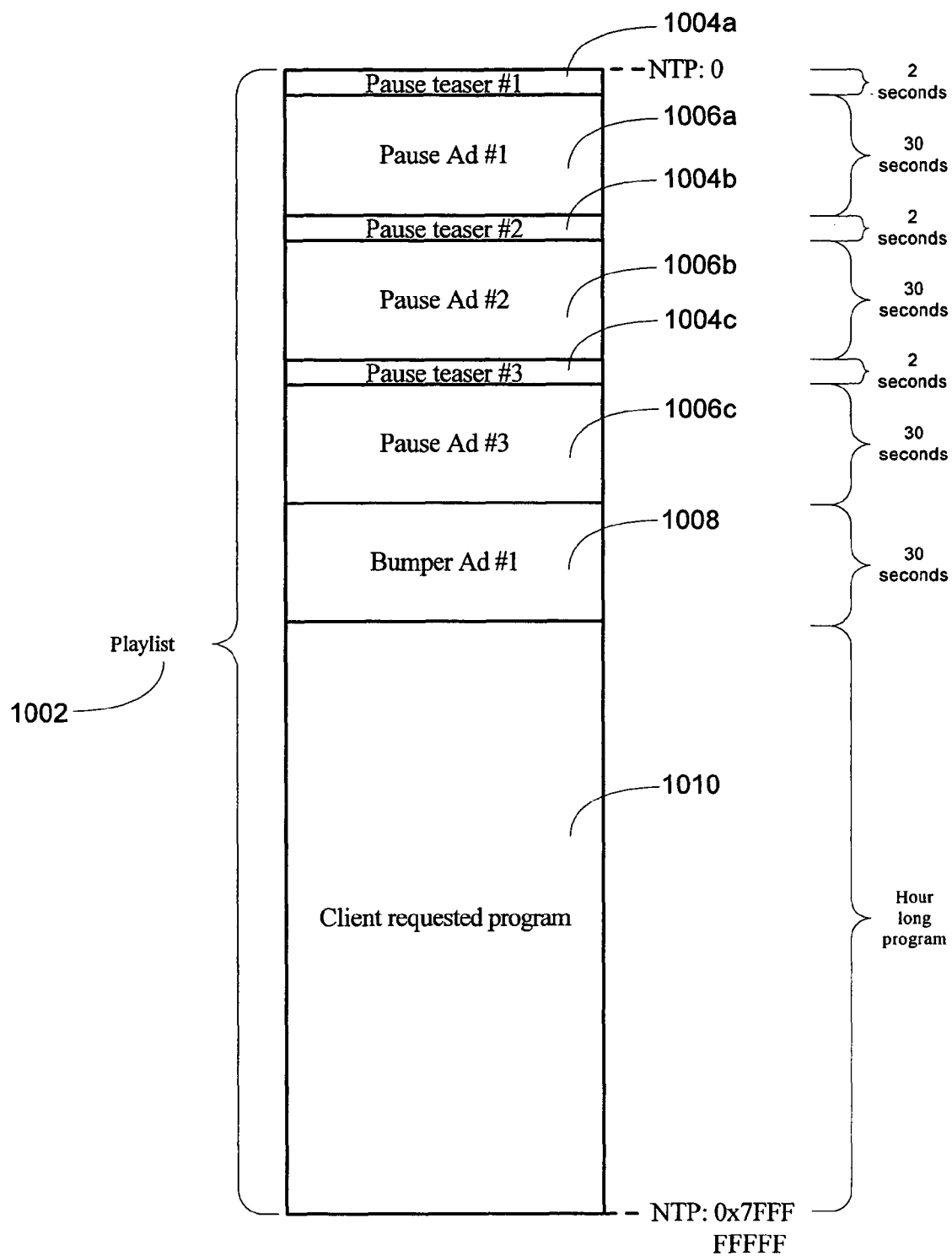
FIG. 10 is a block diagram presenting a combination playlist consisting of bumper and pause advertisements prepended to a viewer requested asset according to one embodiment of the present invention.

A third embodiment of a playlist is presented in FIG. 10. This playlist 1002 is advantageous in situations where the client is viewing "near live" television, which may be described as programs that the NDVR control center is currently receiving and that clients are watching as recorded programming. Because the NDVR control center is currently receiving the program and therefore does not know the duration or NPT length of the program, it is unable to create a playlist for the program with data, such as pause and bumper advertisements, that are appended at the NPT end point of the program.

When the client is viewing a near live program, or when a client requests to view a live program, the ADM generates a playlist 1002 with advertisement data 1004*a*, 1004*b*, 1004*c*, 1006*a*, 1006*b*, 1006*c* and 1008 prepended to the client requested asset. To overcome the uncertainty regarding the program length, the ADM creates a playlist 1002 with a duration that runs from NPT zero to 0x7FFFFFFFF, which is the hexadecimal representation of the most positive 32-bit number that the system is capable of addressing and indicates the end of the last asset in the playlist. Barring programs of an unforeseeably long duration, this time space that the playlist 1002 encompasses should be sufficient to organize a significant number of pause and bumper advertisements in conjunction with the client requested program. Because the client requested program 1010 is of an unknown length, it is unfeasible to place advertisements 1004*a*, 1004*b*, 1004*c*, 1006*a*, 1006*b*, 1006*c* and 1008 in the playlist after the NPT end point of the client requested program 1010. To overcome this uncertainty, advertisements 1004*a*, 1004*b*, 1004*c*, 1006*a*, 1006*b*, 1006*c* and 1008 are appended to the playlist before the client requested program 1010, which runs from the NPT end point of the advertising content to NPT 0x7FFFFFFFF. As with other embodiments of the playlist, the either the client or video server maintains session data and logic to determine an appropriate pause advertisement for presentation to a client; the playlist facilitates locating the content that a given entry in the playlist identifies. The playlist may also contain replacement advertisements and other playlist advertisement types.

Although embodiments of the playlist presented in FIGS. 7, 8, 9 and 10 present distinctions between bumper, pause teaser and pause advertisements, this is not a necessary limitation of the present invention. An ADM may define a playlist as a listing of content, such as advertising and programming, without drawing any distinction between the constituent pieces of content. Accordingly, the playlist may define a number of pieces of advertising content and a client requested asset whereby the video server arbitrarily selects a piece of advertising content to present to the client in response to an avail. For example, the video server may arbitrarily select one or more pieces of advertising content to present prior to presenting a client requested program, so called bumper advertisements, while selecting other pieces of advertising content in response to the client generating avails such as pause advertisements and other avail opportunities. According to one embodiment, these NPT indicators are not be transmitted to the client to prevent it from segmenting out bumper or replacement advertisements.

Figure 11:
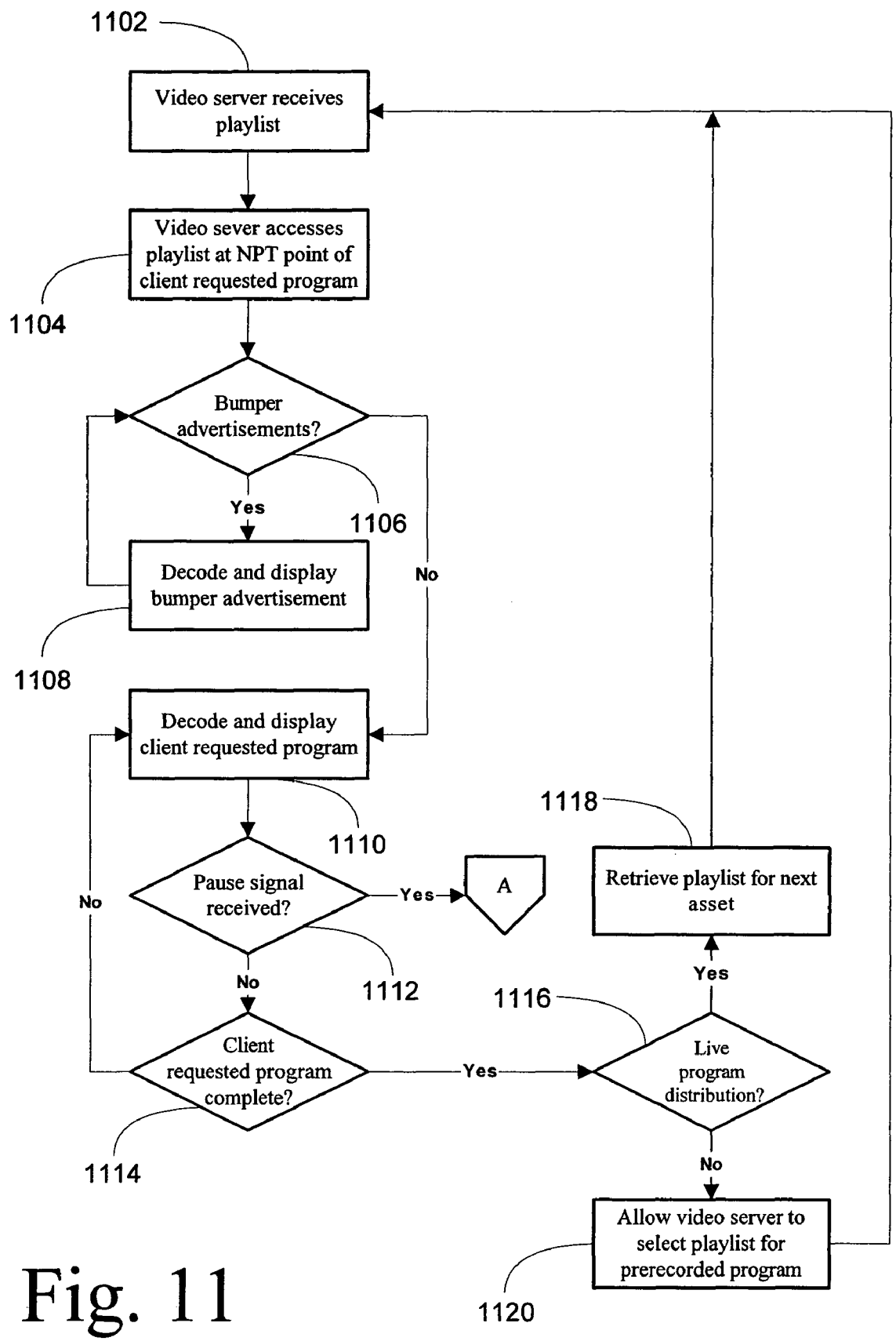
FIG. 11 is a flow diagram presenting a method for bumper advertisement playback according to one embodiment of the present invention.

Building on the description of the NDVR delivery system of the present invention, FIG. 11 illustrates a method for presenting bumper advertisements according to one embodiment of the present invention. The video server receives a playlist in response to control command from a client requesting a program, step 1102. The video sever accesses the playlist that it receives to determine the NPT point at which the client requested program begins, step 1104. The video server also examines the playlist that it receives to determine if the playlist comprises a bumper advertisement, step 1006. Where the playlist comprises a bumper advertisement, step 1106, the video server accesses the bumper advertisement and delivers it to the client for decoding and display, step 1108. Processing returns to step 1106, at which point the video server checks for and transmits to the client any additional bumper advertisements, step 1108. Although the video server is performing this action, the client is unaware that the video server is sending separate pieces of content as the client views the entire playlist as a single unified piece of content.

The video server delivers all the bumper advertisements in a given playlist to the client and begins transmitting the client requested program to the client for decoding and display on a display device, step 1110. The client can optionally be allowed to Fast Forward or rewind through the content as if it were all one contiguous segment. Once the video server begins to transmit the client requested program, it awaits subsequent control commands from the client. The video server performs a check to determine if an incoming control command is a pause signal, step 1112. Where the video server receives a pause command, program control passes over link "A" to FIG. 12, which illustrates one embodiment of a method for delivering pause advertisements to a client. If the video server does not receive a control command consisting of a pause signal, step 1112, it performs a check to determine if the client requested program is complete, step 1114. When the checks that the video server performs at steps 1112 and 1114 return false, the video server continues transport of the requested program to the client, step 1110.

When the client requested program is complete, resulting in the check at step 1114 evaluating to true, or the client tunes away from the program that he or she requested, the video server performs an additional check to determine if the client is attempting to request a program that the NDVR control center is distributing live, step 1116. Where the client is requesting a program that is currently being broadcast from the NDVR control center, co-called "live distribution", step 1116, the video server works in conjunction with the ADM and one or more ADS's to generate a playlist that is suitable to instruct the video server which programs or advertisements it should transmit to the client in response to various control commands in a live distribution scenario, step 1118. Similarly, when the client is selecting a prerecorded or near live program for playback, the video server works in conjunction with the ADM and one of more ADS's to generate a playlist for playback of the prerecorded program, step 1120. Regardless of whether the client is attempting to view live or recorded television, step 1116, program control returns to step 1102 where the video server receives the appropriate playlist for delivery of the subsequent program.

Figure 12:
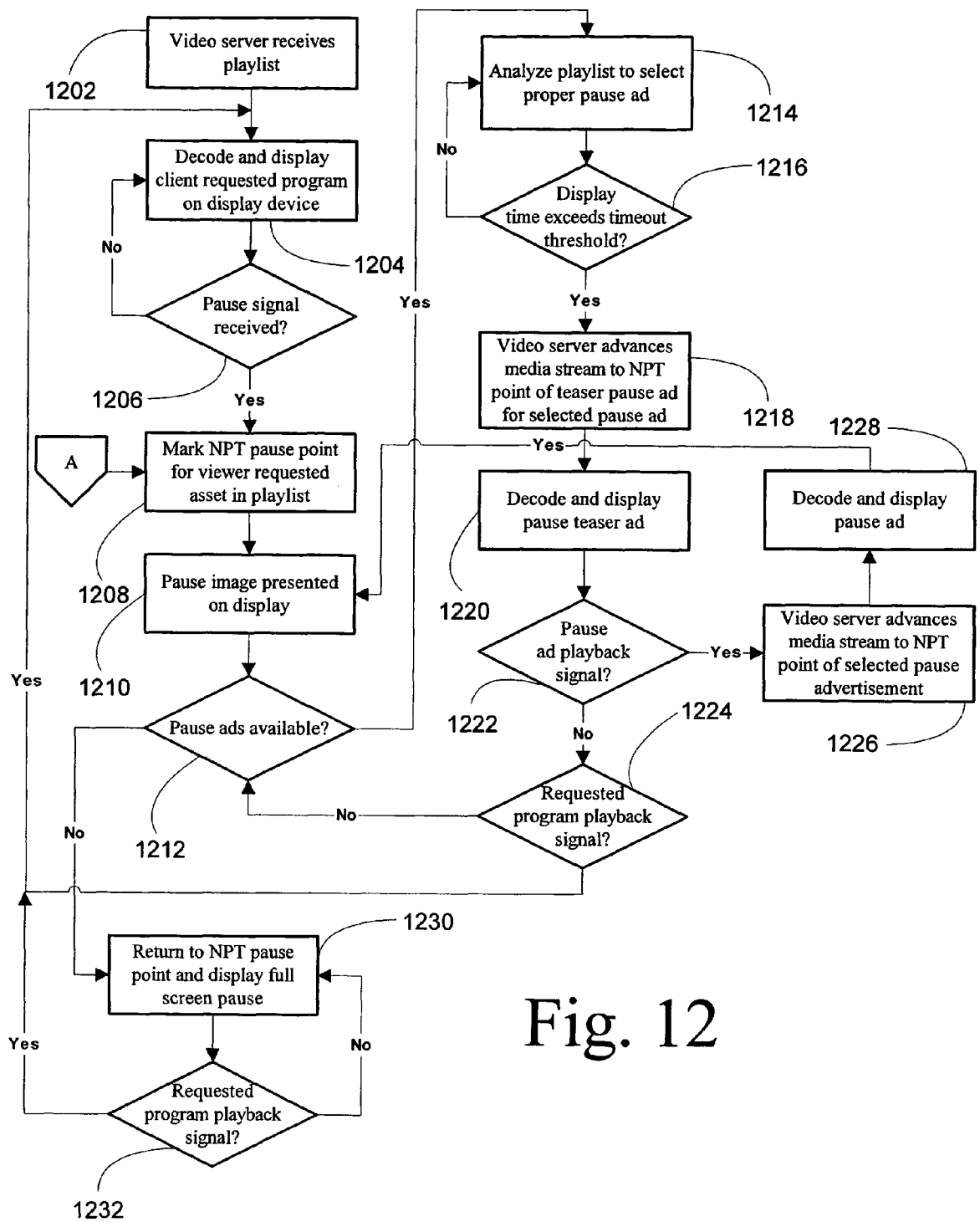
FIG. 12 is a flow diagram presenting a method for pause advertisement playback according to one embodiment of the present invention.

One embodiment of a method for controlling the operation of the system of the present invention for pause advertisement delivery is presented in FIG. 12. According to this embodiment, the video server receives a playlist, step 1202, and transmits the client requested program for decoding and display on the client's display device, step 1204. It should be noted that the video server may transmit any bumper advertisements that comprise the playlist for display on the client's display device according to step 1204. As the video server transmits the client requested program, along with any bumper or replacement advertisements, the video server interprets control commands that it receives from the client. If the client does not transmit a pause control command, step 1206, the video server continues to transmit video, step 1204.

Where the user transmits a pause control command, step 1206, the client or video server marks the NPT of the pause point in the client requested program indicating the point in time that the client transmits the pause control command, step 1208. In response to receipt of the pause control command, the client retrieves a pause image for display, step 1210. According to one embodiment, the client displays the video frame located at the NPT pause point. Alternatively, the client may display the video frame located at the NPT pause point in a video still wrapper, such as a gif or jpeg image whereby the video frame is reduced in size. Preferably, the overlay image provides instructions to the client indicating that the system is in pause mode and commands to reinitiate playback of the program. The client may also insert a pause icon on the screen at this time.

The client performs a check to determine if pause advertisements are available in the playlist, step 1212. Where no pause advertisements are available, step 1212, the client stays at the NPT pause point and continues to display a fuill screen pause, step 1230. Alternatively, the client displays paused video in conjunction with the video graphics causing the video server to await receipt of a play control command. According to other embodiments, the client may locally maintain other still images or video data for presentation while the program is paused or play the pause teaser as a video in a picture-in-picture format. The client continues to display the pause screen, with or without the video graphics, step 1230, while the check that it performs at step 1232 evaluates to false. When the client transmits a play control command, step 1232, the video server resumes transmission of the program data for the client to decode and display on the display device, step 1204.

When the playlist comprises pause advertisements for playback in response to an NDVR avail, step 1212, the client analyzes the playlist metadata to select a proper pause advertisement, step 1214, e.g., using a first-in first-out or round robin approach. The client determines the proper pause teaser advertisement-pause advertisement pair to use and issues the correct commands to the video server. Analysis continues, step 1214, until the wait period exceeds a timeout threshold, step 1216. When the pause time exceeds the threshold, the video server advances the media stream to the NPT point of the pause teaser advertisement for the pause advertisement that the video server selects, step 1218, and transmits the pause teaser advertisement to the client for decoding and display, step 1220. Alternatively the client may go in to a screen saver session teardown mode after an excessively long timeout. Preferably, the video server also transmits instructions to the client for display as to the manner in which the full pause advertisement is viewed. Alternatively, the client may receive instructions in advance for storage on a local storage device that the client displays on the display device when necessary, e.g., "Press the pause to watch the full advertisement".

If the video server does not receive a pause advertisement playback control command from the client, step 1222, it checks for a requested program playback control command, step 1224. If both checks at step 1222 and 1224 evaluate to false, program control passes to step 1212 where the video server optionally performs another check to determine if additional pause advertisements are available in the playlist. Where the video server does receive a requested program playback signal from the client, step 1224, the video server resumes transmission of the program data for the client to decode and display on the display device, step 1204.

Returning to step 1222, where the client views a pause teaser advertisement a check is performed to determine if the viewer transmits a pause advertisement control command. The pause advertisement control command is a command signal that instructs the video server to begin transmission of a pause advertisement. The pause advertisement control command may be any given key on a viewer's remote control device that the video server is programmed to recognize as such. For example, after the video server delivers a teaser pause advertisement, it may present a video overlay indicating the appropriate key that the viewer must depress to transmit a pause advertisement control command and thereby commence playback of the pause advertisement.

Where the check at step 1222 evaluates to true, the client directs the video server to the NPT point of the pause advertisement that is associated with the pause teaser advertisement, step 1226. The video server transmits the pause advertisement, which the client decodes for display on the client's display device, step 1228. When the video server completes transmission of the pause advertisement, it returns to transmission of the pause image, step 1210, at which point the process repeats with the check at step 1212. According to an alternative embodiment of the method, when the video server exceeds the timeout threshold at step 1216, program flow proceeds directly to step 1226 whereby the video server advances the media stream to the NPT point of the pause advertisement and bypasses any pause teaser advertisements. Program flow otherwise follows as shown.

Figure 13:
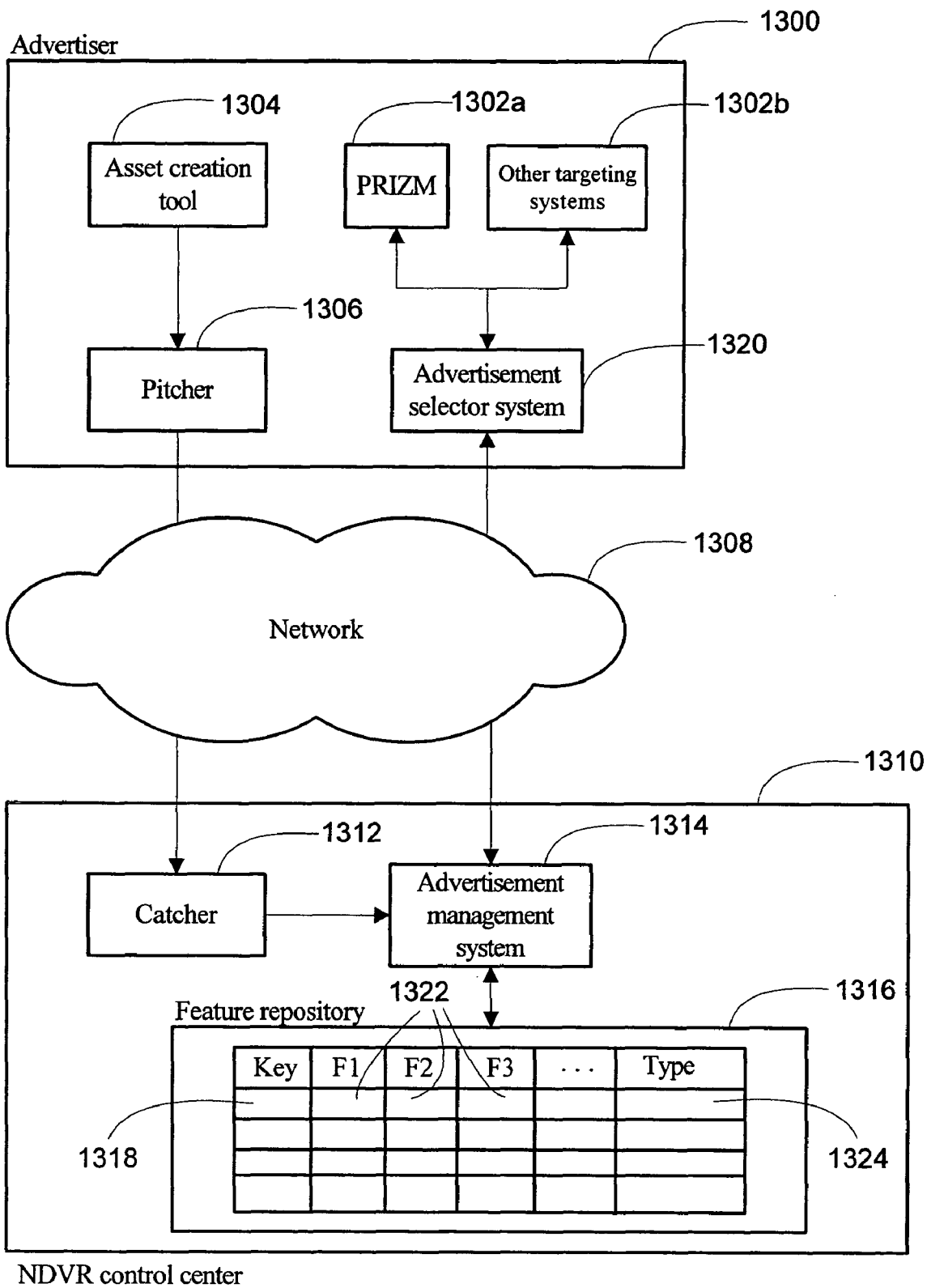
FIG. 13 is a block diagram presenting a configuration of hardware and software components to provide targeted advertising without the release of personally identifiable information according to one embodiment of the present invention.

Various embodiments of the invention contemplate the video server and ADM collecting information regarding clients, some of which the ADS uses to select advertisements for presentation to the client. Information collected from clients in a cable television system is subject to a number of Federal laws and regulations, e.g., 47 U.S.C. §551, et seq. FIG. 13 presents one embodiment of the invention that comprises functionality that allows for delivering targeted advertising to clients without the NDVR control center releasing personally identifiable information to a third party.

According to the embodiment of FIG. 13, an advertiser 1300 utilizes an asset creation tool 1304 to create or modify an advertisement. Advertisers use a pitching mechanism 1306, e.g., hardware configured to transmit data over a satellite transmission medium, to pass the advertisement over a network 1308. On the receiving side of the transmission, a catcher 1312 under the control of an NDVR control center 1310, receives advertisements and advertisement metadata. The catcher passes these data to an Advertisement Management System (AMS) 1314, which registers the advertisement according to its internal mechanisms to thereby make the advertisement available for selection by an advertiser.

Advantageously, the NDVR control center 1310 also maintains a feature repository 1316 that contains information regarding every client (not pictured) that it may access. The feature repository 1316 may implement any number of well known data storage methodologies including, but not limited to, a tab or comma delimited flat file data structure, XML schema, a relational database, an object oriented database and a hybrid object relational database.

Clients in the NDVR system of the present invention routinely transmit addressing information that allows a video sever to properly route requested programming. The ADM 1314 inserts this addressing information, e.g., a client's MAC or IP address, into the feature repository as a key 1318 to perform later selection of client information when it receives an advertisement request, e.g., NDVR avail. In addition to addressing information, the operator of the NDVR control center 1310 is free to collect information regarding clients according to any legal technique, including purchasing information regarding clients from third parties. For example, the NDVR control center may contract with a company that compiles magazine subscription information or one that collects information regarding client's shopping habits. The ADM inserts this client information as "features" 1322 in the feature repository for a given client. Other fields, such as a type field 1324 to further describe a client, are within the scope of data that the feature repository is intended to maintain.

The video server typically passes a request to the ADM 1314 for advertisement selection and playlist generation when a client attempts to access programming and advertising. In response to a request, the ADM 1314 accesses the feature repository 1316 to select information regarding the client. According to one embodiment, the video server provides the ADM 1314 with an address or other information that uniquely identifies the client that is generating the request. The ADM uses this address or other unique identifier as a key 1318 to retrieve features 1322 from the feature repository 1316 that describe the client.

The ADM 1314 comprises logic, e.g., query building functionality, which it uses to determine which features 1322 to retrieve from the feature repository 1316. Regardless of the query that the ADM 1314 formulates, the ADM 1314 does not retrieve enough information for a third party to personally identify a given client. Federal law, e.g., 47 U.S.C. §551 et seq., and their associated rules, provides guidelines on the amount of data regarding a client that constitutes personally identifiable, which the ADM 1314 implements and are herein incorporated by reference in their entirety. For example, a database administrator may periodically review the feature repository 1316 to ensure that a third party cannot use any given feature 1322, either alone or in combination, to identify a person as per the applicable statutes.

The ADM 1314 retrieves features 1322 for a given client on the basis of the key 1318 associated with the client and generates an advertising request for transmission to an advertiser 1300. The ADM 1314 transmits the request to the advertiser's ADS 1320 over the network 1308. The ADS 1320 comprises an interface to one or more targeting systems to assist in determining the proper advertisements that it should instruct the ADM 1314 to include in the playlist. One exemplary targeting system is PRIZM 1302a, which compiles demographic information regarding clients on the basis of geography. Furthermore, the advertiser may provide the ADS 1320 with interfaces to other targeting systems 1302b to facilitate advertisement selection. Such exemplary targeting systems include, but are not limited to, AXCIOM codes by Experian, simple ZIP+4 geographic targeting and demographic targeting. Alternatively, the ADS may comprise targeting logic to select advertisements on the basis of the advertising request.

The ADS 1320 analyzes the advertising, either alone or in conjunction with other targeting systems 1302a and 1302b, and retrieves one or more advertisement identifiers that the ADS 1320 transmits over the network back to the ADM 1314. The ADM 1314 uses the advertisement identifiers to generate a playlist. The ADM passes the playlist to the video server, which uses the playlist as a guide to determine the appropriate content (including targeted advertising) that it should transmit to the requesting client. By using the feature repository, the NDVR control center 1310, through use of its ADM 1314, provides for third party targeting of advertisements without revealing personally identifiable information about any given client.

Figure 14A:
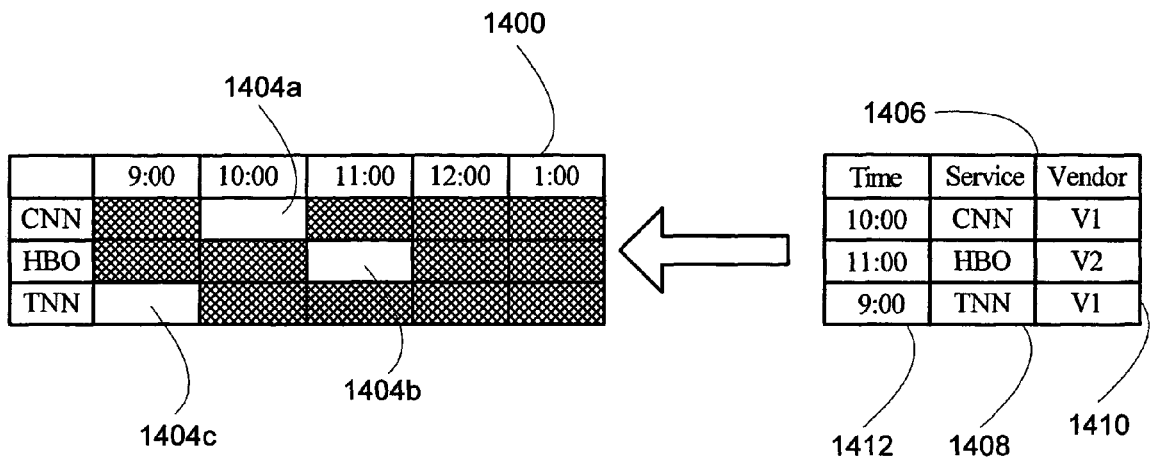
FIG. 14A is a block diagram presenting a relationship between advertisement availability and advertisement vendors according to one embodiment of the present invention.

The NDVR system of the present invention works more effectively with third party advertisers when the parties exchange metadata that describes advertisements. Moreover, the NDVR system should preferably provide a mechanism for associating advertising vendors with advertising avails in a given programming lineup. FIG. 14A presents one embodiment of a relationship between advertisers and a programming lineup. The NDVR control center maintains a programming schedule of broadcast channels and times 1400. Within this programming schedule 1400, the NDVR control center determines times during which it is broadcasting programming that requires advertisements 1404a, 1404b and 1404c.

The NDVR control center preferably maintains an advertising matrix or mapping 1406 between programs, which are identified as a given time slot 1412 on a given channel 1408 and advertising vendors 1410. This relationship can be obtained by the API registration command whereby an ADS vendor requests to insert advertisements for a particular network, among other parameters, including but not limited to ad type and scope, e.g., national/local. The NDVR control center periodically examines its advertising matrix 1406 to identify programming that requires advertisements 1404a, 1404b and 1404c. The NDVR control center consults its advertising map 1406 and determines the proper vender from which to select advertising for insertion into a given program. For example, assume that the NDVR control center identifies that the program being broadcast on CNN at 10:00 requires advertising 1404a. The NDVR control center consults its advertising map 1406 and determines that vendor VI provides advertising for CNN and retrieves advertisement that belong to vendor VI for insertion into the 10:00 program 1404a on CNN.

Figure 14B:
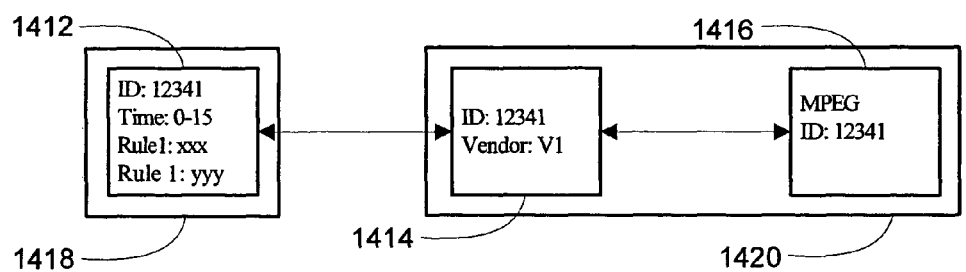
FIG. 14B is a block diagram presenting a relationship between advertiser information and a video asset by way of canonical metadata according to one embodiment of the present invention.

FIG. 14B presents one embodiment of canonical metadata that the NDVR control center maintains to associate an advertiser's arbitrarily complex metadata with video data at the NDVR control center. Canonical, as the term is used herein, refers to data or metadata that conforms to a standard format for maintaining the relevant data, as opposed to non-canonical metadata, which may conform to any arbitrary format. According to the embodiment, an advertiser 1418 maintains arbitrarily complex metadata 1412 regarding its advertisements. Accordingly, the advertiser is free to maintain as much information regarding an advertisement as its business needs require. For example, the advertiser's metadata 1412 may comprise an advertisement's unique identifier, name, date, substance or other description, time from in which the advertisement is capable of being selected for broadcast and one or more broadcast rules that the advertiser uses in selecting an advertisement for broadcast.

When the NDVR control center 1420 receives an advertisement from an advertiser, it creates canonical metadata. Preferably, this canonical metadata comprises no more information than the NDVR control center 1420 requires to associate an advertiser 1412 with piece of advertisement content 1416, e.g., an MPEG video. According to the exemplary relationship of FIG. 14B, the NDVR control center 1420 maintains canonical metadata 1414 regarding the advertisement 1416 that comprises only the unique identifier for the advertisement and the advertiser that owns the advertisement. In this manner, when an advertiser 1418 selects an advertisement that it wishes the NDVR control center 1420 to display to a client, the advertiser 1418 transmits only the advertisement's unique identifier. Essentially, the canonical metadata 1414 acts to bind the advertiser's metadata 1412 with the advertisement 1416 that the NDVR control center 1420 maintains. This metadata relationship allows individual advertisers to maintain arbitrarily complex metadata 1412, which satisfies an advertiser's own requirements regarding information that it requires for advertisement targeting, while the NDVR control center 1420 only maintains metadata 1414 that allows an advertiser 1418 to identify an advertisement 1416 and cause the NDVR control center 1420 to retrieve that advertisement 1416 for delivery to a client.

Figure 15:
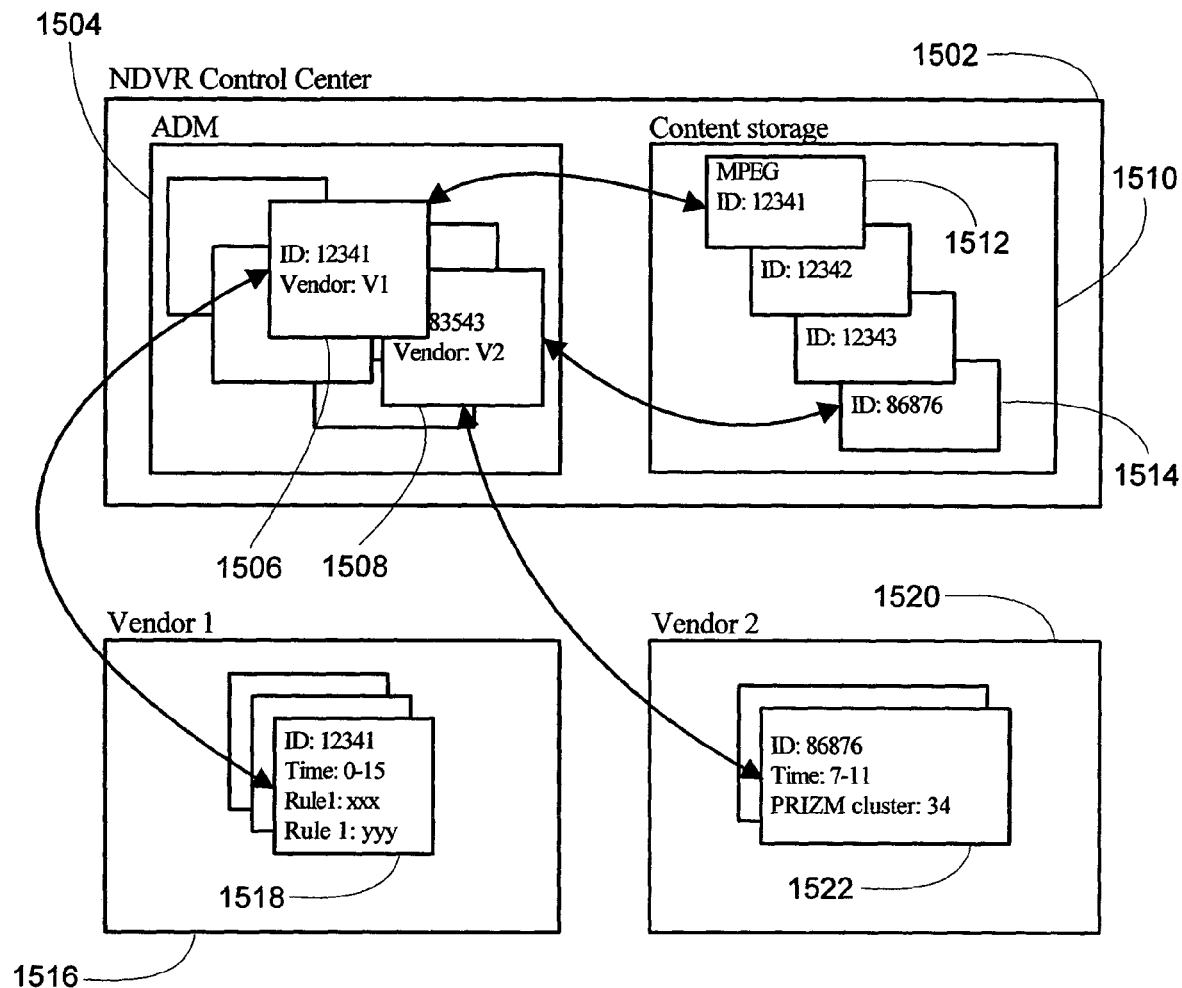
FIG. 15 is a block diagram presenting hardware and software components for creating a relationship between advertiser information and a video asset by way of canonical metadata according to one embodiment of the present invention.

FIG. 15 builds on the canonical metadata presented in FIG. 14B by illustrating the relationship between the NDVR control center and multiple advertising vendors. A first vending advertiser 1516 maintains metadata 1518 for advertisements that it registers with the NDVR control center 1502. As explained previously, the advertisers 1516 and 1520 use their advertising metadata 1518 and 1522 to select advertisements for targeting to specific clients. The first advertiser 1516 maintains metadata 1518 that comprises information and is in a format that allows it to select advertisements for targeting according to the given targeting methodology that it employs. A second advertiser 1520 also maintains advertising metadata 1522 that comprises information and is in a format that allows it to select advertisements for targeting according to the given targeting methodology that it employs. As can be seen from the illustration, each advertising vendor 1516 and 1520 maintains advertising metadata 1518 and 1522 that comprises information that is specific to facilitating advertisement targeting according to each advertiser's targeting methodology, e.g., each advertiser maintains arbitrarily complex metadata.

Each advertiser 1516 and 1520 transmits advertising to the NDVR control center 1502, which stores the advertising 1512 and 1514 in its content storage 1510, which may be any type of data store known to those of skill in the art. In addition to the advertising, the NDVR control center also receives advertisement metadata that it uses to create canonical metadata 1506 and 1508 for storage in the ADM 1504. Preferably, the canonical metadata comprises only enough information to allow the ADM 1504 to receive instructions from an advertiser to play an advertisement and select the appropriate advertisement from content storage 1510. For example, assume that the ADM 1504 provides an advertiser 1516 with an opportunity to present an advertisement to a client. The advertiser 1516 implements a targeting algorithm and selects a given advertisement on the basis of its metadata 1518. The advertiser 1516 returns an advertisement identifier to the ADM 1504, which uses the identifier to locate the content 1512 that is associated with the canonical metadata.

Figure 16:
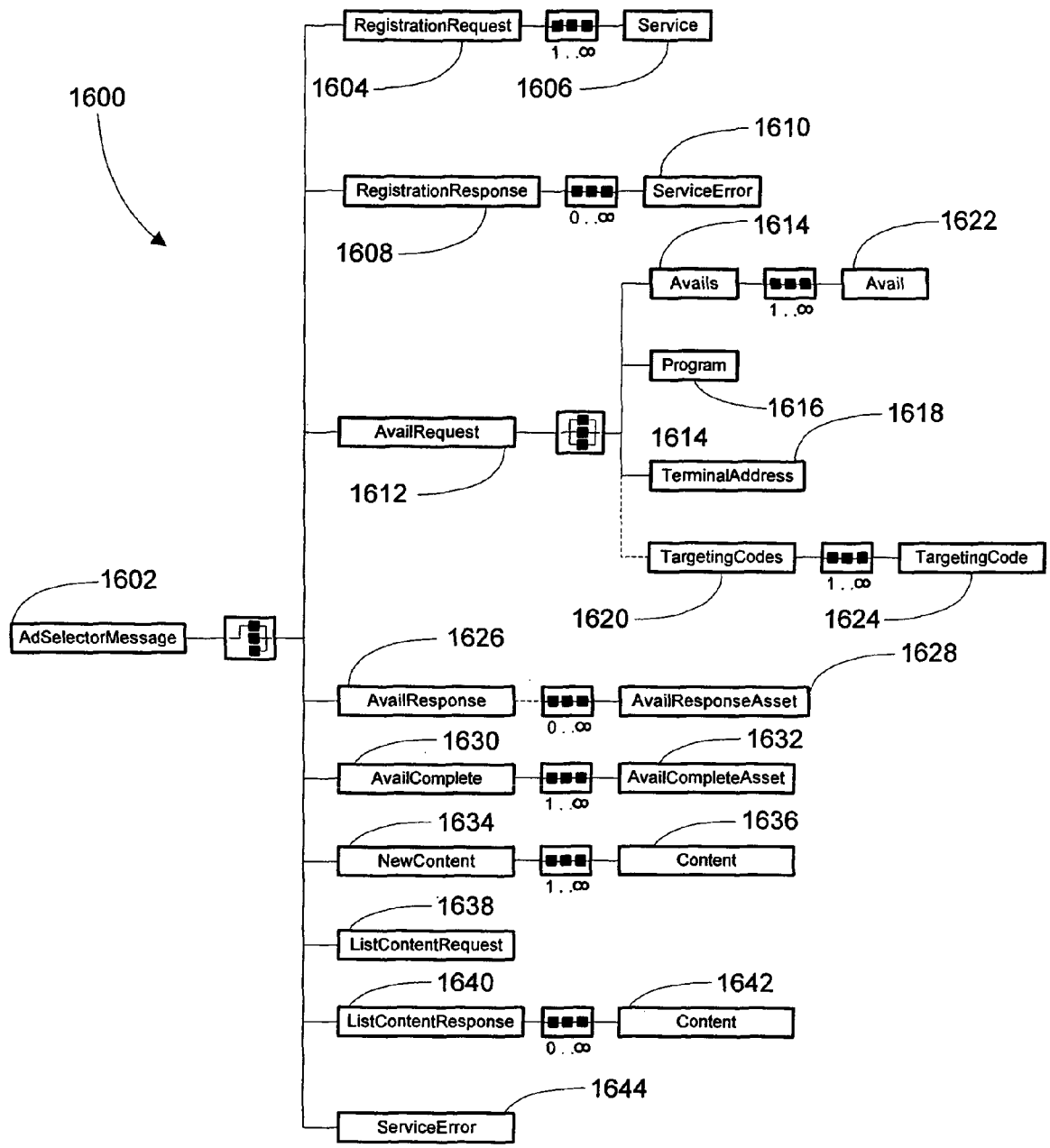
FIG. 16 is a tree diagram presenting an application program interface for communication between an advertising vendor and advertisement subsystem of an NDVR distribution system according to one embodiment of the present invention.

In order to facilitate communications between an ADM and one or more ADS systems that one or more advertisers are operating, there must be a common application program interface (API) between the ADM and ADS. FIG. 16 presents one embodiment of an extensible Markup Language (XML) API to ensure a common interface between the ADM and ADS. According to the "tree view" of the XML API illustrated in FIG. 16, an AdSelectorMessage 1602 is the root message type that passes between an ADS and an ADM that an NDVR control center is operating to facilitate requests for advertisements in satisfaction of a given avail. According to one embodiment of the invention, the communication is conducted according to HTTP over a TCP socket connection.

One type of AdSelectorMessage is a RegistrationRequest 1604 that an ADS passes to the NDVR control center's ADM to facilitate registration of the ADS with the ADM. The RegistrationRequest 1604 allows an ADS to register with the ADM as a service vender to supply advertisements in response to an avail. Each RegistrationRequest 1604 can identify one or more Services 1606, each Service 1606 identifying a scope of the service, e.g., local or national, and an advertisement type of the service, e.g., bumper, pause, replacement, etc. The ADM responds to a properly formatted RegistrationRequest 1604 with a RegistrationResponse 1608 message that acknowledges the RegistrationRequest 1604 and the receipt of the request by the ADM. The RegistrationResponse1 608 may identify zero or more ServiceErrors 1610 indicating an error in the request that the ADS transmits to the ADM. The ServiceErrors 1610, may be simply informational, provide warnings, system errors, etc.

When an event occurs in the operation of the NDVR system of the present invention that results in the creation of an avail, the ADM transmits and AvailRequest 1612 to an ADS. For example, an AvailRequest 1612 may occur when a client session is set up and the ADM must fulfill advertisement availability. The AvailRequest 1612 may contain a number of attributes, such as, but not limited to, a session identifier, a local zone identifier, a service group, a service identifier, a zip+4, etc. The AvailRequest 1612 consists of a number of components that provide context to the request, such as, Avails 1614, Program 1616, TerminalAddress 1618 and optional TargetingCodes 1620. The Avails 1614 consists of one or more Avail components 1622, each identifying an advertisement type, an expected time that the ADM is to fulfill the avail, an original time when the avail was created, an advertiser identifier, the scope of the avail, e.g., local or national, an avail identifier and the duration of the avail. Similarly, the Program 1616 component provides a program identifier and the TerminalAddress 1618 component provides an address for the terminal to which the ADM is to deliver the avail, which is typically the MAC address of the terminal setting up the session. One or more TargetingCode 1624 components optionally identify targeting systems that the ADM is specifying to facilitate the targeting of the advertisement that is to fulfill the avail.

In response to the AvailRequest 1612, the ADS responds with an AvailResponse 1626 message to the ADM consisting of the list of content, e.g., advertisements, for the ADM to instruct the video server to play. The AvailResponse may consist of zero or more AvailResponseAsset 1628 messages that provide asset identifiers for the avails. When the ADM plays the content that the ADS identifies, the ADM passes an AvailComplete 1630 message back to the ADS, which may report the user action. The ADM also passes one or more AvailCompleteAsest messages to the ADS identifying the asset identifier that was played, in addition the start and end time for the avail playback.

The ADS and ADM also pass messages concerning content available at the ADM for playback to a user. For example, when the ADS sends new content to the ADM for storage in the content storage repository at the NDVR control center, the ADM informs the ADS that new content has been added through the NewContent 1634 message, which consists of one or more pieces of Content 1636, each identified by a content identifier. Similarly, when the ADS requires knowledge regarding the content at the ADM, the ADS transmits a ListContentRequest 1638, which causes the ADM to return a list of available content for the given ADS in a ListContentResponse 1640, the response identifying zero or more pieces of Content 1642.

The XML API of FIG. 16 also provides for the ADM and ADS to exchange error information. The ServiceError 1644 identifies an error in the data that the ADM and ADS are exchanging. As with other error messages, the ServiceError 1644 may be simply informational, provide warnings, system errors, etc.

Attached to the Specification is Appendix A, which presents a textual XML description of the tree view diagram illustrated in FIG. 16.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

APPENDIX A

```xml
<?xml version="1.0" encoding="UTF-8"?>
<!-- edited with XMLSPY v5 rel. 4 U (http://www.xmlspy.com (private) -->
<xs:schema xmlns:xs="http://www.w3.org/2001/XMLSchema" elementFormDefault="qualified" attributeFormDefault="unqualified">
    <xs:element name="AdSelectorMessage">
        <xs:annotation>
            <xs:documentation>Root Message. Communication is over HTTP on a nailed up TCP socket connection.
                        ATTRIBUTES:    requestID: 1/2/3/4...
            </xs:documentation>
        </xs:annotation>
        <xs:complexType>
            <xs:choice>
                <xs:annotation>
                    <xs:documentation>Choice: Message is of a particular type.</xs:documentation>
                </xs:annotation>
                <xs:element name="RegistrationRequest">
                    <xs:annotation>
                        <xs:documentation>REQUEST: ADS => ADM    RegistrationRequest allows an ADS to register
                                    with the AdManager as a service vendor.
                                    ATTRIBUTES:   type: register/unregister    ADSName:    version: 1.0
                        </xs:documentation>
                    </xs:annotation>
                    <xs:complexType>
                        <xs:sequence maxOccurs="unbounded">
                            <xs:element name="Service">
                                <xs:annotation>
                                    <xs:documentation>Service in CDATA. ATTRIBUTES: scope: Local/National
                                                adType: Bumper/Pause/Re
                                    </xs:documentation>
                                </xs:annotation>
                                <xs:complexType>
                                    <xs:attribute name="scope" use="required">
                                        <xs:simpleType>
                                            <xs:restriction base="xs:string">
                                                <xs:enumeration value="Local"/>
                                                <xs:enumeration value="National"/>
                                            </xs:restriction>
                                        </xs:simpleType>
                                    </xs:attribute>
                                    <xs:attribute name="adType" use="required">
                                        <xs:simpleType>
                                            <xs:restriction base="xs:string">
                                                <xs:enumeration value="Bumper"/>
                                                <xs:enumeration value="Pause"/>
                                                <xs:enumeration value="Replacement"/>
                                                <xs:enumeration value="PauseTeaser"/>
                                                <xs:enumeration value="PauseStill"/>
                                            </xs:restriction>
                                        </xs:simpleType>
                                    </xs:attribute>
                                </xs:complexType>
                            </xs:element>
                        </xs:sequence>
                        <xs:attribute name="type" use="required">
                            <xs:simpleType>
                                <xs:restriction base="xs:string">
                                    <xs:enumeration value="register"/>
                                    <xs:enumeration value="unregister"/>
                                </xs:restriction>
                            </xs:simpleType>
                        </xs:attribute>
                        <xs:attribute name="ADSName" type="xs:string" use="required"/>
                        <xs:attribute name="version" type="xs:string" use="required"/>
                    </xs:complexType>
                </xs:element>
                <xs:element name="RegistrationResponse">
                    <xs:annotation>
                        <xs:documentation>RESPONSE: ADM => ADS         RegistrationResponse acks the
                                    ADS registration request.
                        </xs:documentation>
```

```xml
        </xs:annotation>
        <xs:complexType>
            <xs:sequence minOccurs="0" maxOccurs="unbounded">
                <xs:element ref="ServiceError"/>
            </xs:sequence>
        </xs:complexType>
</xs:element>
<xs:element name="AvailRequest">
    <xs:annotation>
        <xs:documentation>REQUEST: ADM => ADS   AvailRequest occurs when a client session is
                            setup and an ad availability has occured and is being requested.
                            ATTRIBUTES: sessionID: 1/2/3/4...      localZone: OSH...
                            serviceGroup: 456....    zipPlus4: 800271234
                            service: CNN/TNT
        </xs:documentation>
    </xs:annotation>
    <xs:complexType>
        <xs:all>
            <xs:element name="Avails">
                <xs:complexType>
                    <xs:sequence maxOccurs="unbounded">
                        <xs:element name="Avail">
                            <xs:annotation>
                                <xs:documentation>ATTRIBUTES: adType: Bumper/Pause...
                                            expectedTime: UTC/8601 originalTime: UTC/8601
                                            advertiser: scope: Local/National availID: 1/2/3/4
                                            minDuration: 30 maxDuration: 30 expectedDuration:
                                            30 numberOfAds: 1
                                </xs:documentation>
                            </xs:annotation>
                            <xs:complexType>
                                <xs:attribute name="adType" use="required">
                                    <xs:simpleType>
                                        <xs:restriction base="xs:strings">
                                            <xs:enumeration value="Bumper"/>
                                            <xs:enumeration value="Replacement"/>
                                            <xs:enumeration value="Pause"/>
                                            <xs:enumeration value="PauseTeaser"/>
                                            <xs:enumeration value="PauseStill"/>
                                        </xs:restriction>
                                    </xs:simpleType>
                                </xs:attribute>
                                <xs:attribute name="expectedTime" type="xs:string" use="required"/>
                                <xs:attribute name="originalTime" type="xs:string" use="optional"/>
                                <xs:attribute name="advertiser" type="xs:string" use="optional"/>
                                <xs:attribute name="availID" type="xs:string" use="required"/>
                                <xs:attribute name="scope" use="required">
                                    <xs:simpleType>
                                        <xs:restriction base="xs:string">
                                            <xs:enumeration value="Local"/>
                                            <xs:enumeration value="National"/>
                                        </xs:restriction>
                                    </xs:simpleType>
                                </xs:attribute>
                                <xs:attribute name="minDuration" type="xs:string" use="optional"/>
                                <xs:attribute name="maxDuration" type="xs:string" use="optional"/>
                                <xs:attribute name="expectedDuration" type="xs:string" use="optional"/>
                                <xs:attribute name="numberOfAds" type="xs:string" use="optional"/>
                            </xs:complexType>
                        </xs:element>
                    </xs:sequence>
                </xs:complexType>
            </xs:element>
            <xs:element name="Program">
                <xs:annotation>
                    <xs:documentation>Program in CDATA of element.
                                    ATTRIBUTES:        programID: 1/2/3/4...
                    </xs:documentation>
                </xs:annotation>
                <xs:complexType>
                    <xs:attribute name="programID" type="xs:string" use="required"/>
                </xs:complexType>
            </xs:element>
            <xs:element name="TerminalAddress">
                <xs:annotation>
                    <xs:documentation>Usually the MAC address of the terminal setting up a session.
                                    ATTRIBUTES: type: IP/MAC/UNIT/SN
                    </xs:documentation>
                </xs:annotation>
                <xs:complexType>
```

```xml
                        <xs:simpleContent>
                            <xs:extension base="xs:string">
                                <xs:attribute name="type" use="required">
                                    <xs:simpleType>
                                        <xs:restriction base="xs:string">
                                            <xs:enumeration value="IP"/>
                                            <xs:enumeration value="MAC"/>
                                            <xs:enumeration value="UNIT"/>
                                            <xs:enumeration value="SN"/>
                                        </xs:restriction>
                                    </xs:simpleType>
                                </xs:attribute>
                            </xs:extension>
                        </xs:simpleContent>
                    </xs:complexType>
                </xs:element>
                <xs:element name="TargetingCode" minOccurs="0">
                    <xs:complexType>
                        <xs:sequence maxOccurs="unbounded">
                            <xs:element name="TargetingCode">
                                <xs:annotation>
                                    <xs:documentation>Code in CDATA of element. ATTRIBUTES:
                                        providerName:
                                    </xs:documentation>
                                </xs:annotation>
                                <xs:complexType>
                                    <xs:attribute name="providerName" type="xs:string" use="required"/>
                                </xs:complexType>
                            </xs:element>
                        </xs:sequence>
                    </xs:complexType>
                </xs:element>
            </xs:all>
            <xs:attribute name="sessionID" type="xs:string" use="required"/>
            <xs:attribute name="localZone" type="xs:string" use="required"/>
            <xs:attribute name="serviceGroup" type="xs:string" use="required"/>
            <xs:attribute name="zipPlus4" type="xs:string" use="optional"/>
            <xs:attribute name="service" type="xs:string" use="required"/>
        </xs:complexType>
    </xs:element>
    <xs:element name="AvailResponse">
        <xs:annotation>
            <xs:documentation>RESPONSE: ADS => ADM
                AvailResponse: The response to the avail request. Returns a list of content to
                be played. ATTRIBUTES: sessionID: 1/2/3/4...
            </xs:documentation>
        </xs:annotation>
        <xs:complexType>
            <xs:sequence minOccurs="0" maxOccurs="unbounded">
                <xs:element name="AvailResponseAsset">
                    <xs:annotation>
                        <xs:documentation>AssetID in CDATA for element.
                            ATTRIBUTES: playID: 1/2/3/4... availID: 1/2/3/4...
                        </xs:documentation>
                    </xs:annotation>
                    <xs:complexType>
                        <xs:attribute name="playID" type="xs:string" use="required"/>
                        <xs:attribute name="availID" type="xs:string" use="required"/>
                    </xs:complexType>
                </xs:element>
            </xs:sequence>
            <xs:attribute name="sessionID" type="xs:string" use="required"/>
        </xs:complexType>
    </xs:element>
    <xs:element name="AvailComplete">
        <xs:annotation>
            <xs:documentation>REQUEST: ADM => ADS
                AvailComplete: Sent from AdManager when the content was played. May report
                the user action.
            </xs:documentation>
        </xs:annotation>
        <xs:complexType>
            <xs:sequence maxOccurs="unbounded">
                <xs:element name="AvailCompleteAsset">
                    <xs:annotation>
                        <xs:documentation>AssetID in CDATA for element.
                            ATTRIBUTES: playID:    1/2/3/4...    startTime: UTC in ISO 8601
                            endTime: UTC in ISO 8601 userAction: FF/Play/RW...
                        </xs:documentation>
                    </xs:annotation>
```

```xml
                <xs:complexType>
                    <xs:attribute name="playID" type="xs:string" use="required"/>
                    <xs:attribute name="assetID" type="xs:string" use="required"/>
                    <xs:attribute name="startTime" type="xs:string" use="required"/>
                    <xs:attribute name="userAction" use="required">
                        <xs:simpleType>
                            <xs:restriction base="xs:string">
                                <xs:enumeration value="FF"/>
                                <xs:enumeration value="RW"/>
                                <xs:enumeration value="Play"/>
                                <xs:enumeration value="Pause"/>
                                <xs:enumeration value="Stop"/>
                            </xs:restriction>
                        </xs:simpleType>
                    </xs:attribute>
                </xs:complexType>
            </xs:element>
        </xs:sequence>
    </xs:complexType>
</xs:element>
<xs:element name="NewContent">
    <xs:annotation>
        <xs:documentation>REQUEST: ADM => ADS NewContent: Notification that new content has been
                            added to the content store that is relevant to this ADS.
        </xs:documentation>
    </xs:annotation>
    <xs:complexType>
        <xs:sequence maxOccurs="unbounded">
            <xs:element ref="Content"/>
        </xs:sequence>
    </xs:complexType>
</xs:element>
<xs:element name="ListContentRequest">
    <xs:annotation>
        <xs:documentation>REQUEST: ADS => ADM
                                ListContentRequest: Request to returns list of available content for given ADS.
                                CDATA contains ADSName?
        </xs:documentation>
    </xs:annotation>
    <xs:complexType/>
</xs:element>
<xs:element name="ListContentResponse">
    <xs:annotation>
        <xs:documentation>RESPONSE: ADM => ADS
                                ListContentRequest: The list of available content.
        </xs:documentation>
    </xs:annotation>
    <xs:complexType>
        <xs:sequence minOccurs="0" maxOccurs="unbounded">
            <xs:element ref="Content"/>
        </xs:sequence>
    </xs:complexType>
</xs:element>
<xs:element ref="ServiceError"/>
</xs:choice>
<xs:attribute name="requestID" type="xs:long" use="required"/>
</xs:complexType>
</xs:element>
<xs:element name="ServiceError">
    <xs:annotation>
        <xs:documentation>Error text in CDATA of element. ServiceError contains an errorCode attribute of which the
                    meaning is TBD.
                    ATTRIBUTES: errorCode: 301/302    service: CNN/TNT
                    ERROR CODES: 1xx: Informational    2xx: Warnings    3xx: Errors 301: Service
                    Already Re 302: Invalid Service    303: Version Error    304: Asset
                    Missing    305: Request Time Out
                    4xx: System Error    401: Invalid Message Data
        </xs:documentation>
    </xs:annotation>
    <xs:complexType>
        <xs:attribute name="errorCode" type="xs:int" use="required"/>
        <xs:attribute name="service" type="xs:string" use="optional"/>
    </xs:complexType>
</xs:element>
<xs:element name="Content">
    <xs:annotation>
```

```
        <xs:documentation>CDATA contains assetID?</xs:documentation>
      </xs:annotation>
    </xs:element>
</xs:schema>
```

What is claimed is:

1. A system for creating a program for delivery to a client in a video time shifting architecture, the system comprising:
an advertisement selection system (ADS) operative to select one or more advertisements according to address data associated with the client and transmit one or more identifiers that uniquely identify the selected advertisements;
an advertisement management system (AMS) operative to generate a first playlist that identifies content, including a user requested program stored in the video time shifting architecture and the one or more selected advertisements, the AMS being further operative to determine whether the one or more selected advertisements have expired and to request one or more replacement advertisements for the one or more selected advertisements that have expired; wherein the command from the client is a request to play a previously recorded program and wherein at least one of the AMS and the ADS determines advertisement displayed with an original broadcast of the program, the AMS operative to generate a second playlist in response to the request to play the previously recorded program further comprising the advertisement display with the original broadcast of the program;
a video server operative to interpret the first playlist if the request is the program request and the video server operating to interpret the second playlist if the request is the previously recorded program;
deliver the content to the user; and
a reporting system in communication with the video server, the reporting system operable to capture subsequent commands from the user during delivery of the content and determine from the subsequent commands a percentage of the one or more advertisements delivered by the video server to the user.

2. The system of claim 1 wherein the AMS generates a playlist that identifies a given one of the one or more selected advertisements as a bumper advertisements for delivery by the video server prior to the user requested program.

3. The system of claim 1 wherein the AMS generates a playlist that identifies a given one of the one or more selected advertisements as a pause teaser advertisement for delivery by the video server upon receipt of a pause control command.

4. The system of claim 1 wherein the AMS generates a playlist that identifies a given one of the one or more selected advertisements as a pause advertisement for delivery by the video server upon the receipt of a pause advertisement control command.

5. The system of claim 1 wherein the playlist is indexed according to Normal Play Time (NPT).

6. The system of claim 1 wherein the video server is operative to receive a pause control command from a client, mark the location in the playlist that corresponds to a point in time when the video server receives the pause command and advance to an advertisement in the playlist.

7. The system of claim 6 wherein the client displays a pause video still overlay upon transmission of a pause control command.

8. The system of claim 7 wherein the pause video still overlay comprises operating instructions.

9. The system of claim 6 wherein the video server advances to a pause teaser advertisement in the playlist and begins delivery of the pause teaser advertisement.

10. The system of claim 9 comprising delivering the pause teaser advertisement to the client for display.

11. The system of claim 6 wherein the video server returns to the location in the playlist that corresponds to a point in time when the video server receives the pause command and commences delivery of the user requested program.

12. The system of claim 6 wherein the video server advances to and begins delivery of a pause advertisement in response to receipt of a pause advertisement control command.

13. The system of claim 1 wherein the ADS selects the one or more selected advertisements on the basis of aggregate viewing information.

14. The system of claim 13 wherein the ADS comprises a connection to an external targeting system.

15. The system of claim 14 wherein the external targeting system is selected from a group comprising a PRIZM system and an AXCIOM system.

16. The system of claim 1 wherein the ADS transmits advertisements and advertisement metadata to the AMS for storage in a content storage device.

17. The system of claim 16 wherein the AMS transmits an acknowledgement to the ADS upon receipt of the advertisement and advertisement metadata, the AMS comprises at least first computing device and the ADS comprises at least a second computing device coupled over a network to the first computing device, and wherein the AMS is accessible by third party advertisers that transmit advertisements and associated metadata to the AMS from which the AMS selects the one or more advertisements.

18. The system of claim 1 wherein—the metadata for at least one advertisement comprises an indication that the advertisement does not expire, the AMS further operative to deliver the content to the user with the unexpired advertisement.

19. The system of claim 18 wherein the video server requests a new playlist from the AMS upon the receipt of a new program initiation command from the user.

20. The system of claim 19 wherein the AMS transmits a request to the ADS to select one or more local advertisements included in the program as originally broadcast.

21. A method for delivering local advertising to a client in a video distribution system, the method comprising:
performing an action that invokes a request for a program stored on a video server;
collecting information regarding the request;
generating a first playlist utilizing a geographically zoned local advertisement and the requested program wherein the requested program is an original broadcast, and generating a second playlist utilizing a geographically zoned local advertisement and the requested program wherein the requested program is a previously recorded broadcast program;

determining whether the geographically zoned local advertisement has expired and replacing an expired geographically zoned local advertisement with a replacement advertisement;

delivering using a video server the local advertising and program to a client for decoding and playback;

capturing subsequent commands during delivery of the program and the local advertising; and determining from the subsequent commands a percentage of the local advertising delivered by the video server to the client.

22. The method of claim 21 wherein collecting information comprises collecting client information.

23. The method of claim 22 wherein collecting information comprises collecting program information.

24. The method of claim 21 wherein the client performs an action that invokes the request.

25. The method of claim 21 comprising recording one copy of a given program for each local advertising zone that the video distribution system services.

26. The method of claim 25 comprising segmenting local advertising out of each program copy and marking each segmented program copy with a zone identifier.

27. The method of claim 26 wherein collecting information comprises collecting a zone identifier for the zone from which the request originates.

28. The method of claim 26 wherein the segmenting is performed by identifying indicators for local advertising.

29. The method of claim 28 wherein identifying is conducted according to one or more of a set consisting of SCTE 35 cue packets, DTMF cues, contact closures triggered by an analog signal, network messages from an insertion system and network messages from a stat-mux/splicer.

30. The method of claim 21 comprising:
determining if a given correctly zoned local advertisement has expired; and
if the correctly zoned local advertisement has expired, generating a playlist utilizing a replacement local advertisement and the requested program.

31. A system for delivering local advertising to a client in a video distribution system, the system comprising:
a client device operative to perform an action that invokes a request for a program;
an advertisement management system (AMS) operative to collection information regarding the request and generate a first playlist utilizing one or more geographically zoned local advertisements and the requested program wherein the requested program is an original broadcast, and generating a second playlist utilizing a geographically zoned local advertisement and the requested program wherein the requested program is a previously recorded broadcast program, the AMS being further operative to determine whether the one or more geographically zoned advertisements have expired and to request one or more replacement advertisements for the one or more geographically zoned advertisements; and
a video server operative to receive the first playlist and the second playlist and deliver the local advertisement and program to the client for decoding and playback; and
a reporting system in communication with the video server, the reporting system operable to capture subsequent commands from the user during delivery of the local advertisement and program and determine from the subsequent commands a percentage of the local advertisement delivered by the video server to the client.

32. The system of claim 31 wherein the AMS is operative to collect information regarding the requesting client.

33. The system of claim 31 wherein the AMS is operative to collect information regarding the requested program.

34. The system of claim 31 wherein the video server records one copy of a given program for each local advertising zone that the video distribution system services.

35. The system of claim 34 wherein the video server segments local advertising out of each program and marks the segmented local advertising with a zone identifier.

36. The system of claim 35 wherein the video server collects a zone identifier for the zone in which the client resides.

37. The system of claim 34 wherein the video server segments the local advertising by identifying indicators for the local advertising.

38. The system of claim 37 wherein the indicators are selected from a set consisting of SCTE 35 cue packets, DTMF cues, contact closures triggered by an analog signal, network messages from an insertion system and network messages from a stat-mux/splicer.

39. A computerized method for delivering local advertising to a client in a video distribution system, the method comprising;
generating a first playlist utilizing a geographically zoned local advertisement and the requested program wherein the requested program is an original broadcast, and generating a second playlist utilizing a geographically zoned local advertisement and the requested program wherein the requested program is a previously recorded broadcast program;
electronically receiving multiple zoned copies of the given program, each zoned copy containing proper local advertising for a given zone different than another of the multiple zoned copies;
recording a zoned copy of a given program containing proper local advertising for each zone of the video distribution system services at a video server coupled to a plurality of clients over a network;
electronically determining, by using a programmable microprocessor, the zone in which the client requesting a program is located;
electronically determining, by using a programmable microprocessor, whether the proper local advertising contained in the zoned copy of the requested program has expired and replacing the expired proper local advertising with a replacement advertisement; and
transmitting a zoned copy of the requested program from the video server to the client in response to the client requesting the program.

40. The method of claim 39
comprising: receiving a request for a program from the client; and
selecting the zoned copy of the requested program containing proper local advertising.

41. A computerized method for delivering local advertising to a client in a video distribution system, the method comprising:
electronically creating a first playlist wherein a requested program is an original broadcast, and generating a second playlist wherein the requested program is a previously recorded broadcast program with an identifier for the given program and one or more national advertisements;
determining, by using a programmable microprocessor, a geographical zone in which a requesting client resides;
associating one or more local advertisements with the given program wherein the one or more local advertisements include a zone identifier proximate to the geographical zone;

determining whether the geographically zoned local advertisement has expired and replacing an expired geographically zoned local advertisement with a replacement advertisement;

electronically adding identifiers for one or more local advertisements to the playlist based on the determined zone, the first playlist and the second playlist updated in response to a request for the given program from the requesting client; and delivering the first and the second playlist to a video server.

42. The method of claim 41 comprising the video server transmitting data identified in the playlist to a client for decoding and display.

43. The method of claim 41 comprising:

calculating the zone in which a client resides; and selecting the proper local advertising for the zone in which the client resides.

44. The method of claim 41 comprising:

receiving a copy of a given program for each zone that the video distribution system services;

segmenting the received program into program content, national advertising and local advertising; and discarding all but one copy of zoned programming with program content and national advertising.

45. A computerized method for delivering local advertising to a client in a video distribution system, the method comprising:

electronically receiving a copy of a given program for each of a plurality of zones that the video distribution system services at a video server coupled to a plurality of clients over a network; and, for each copy, segmenting the program into program content, national advertising and local advertising;

retaining the program content and discarding the national and local advertising;

receiving a request for the program from a client in a given geographical zone;

associating one or more local advertisements with the request for the program wherein the one or more local advertisements include a zone identifier proximate to the given geographical zone;

determining whether the geographically zoned local advertisement has expired and replacing an expired geographically zoned local advertisement with a replacement advertisement;

electronically creating a first playlist wherein a requested program is an original broadcast, and generating a second playlist wherein the requested program is a previously recorded broadcast program identifying the programming content;

calculating, by using a programmable microprocessor, the a program advertising zone in which the requesting client resides;

adding identifiers for advertising to the first and the second playlist based on the zone in which the client resides; and delivering the playlist to the video server that delivers the content to the requesting client.

46. A computerized method for delivering local advertising to a client in a video distribution system, the method comprising:

receiving a a first playlist wherein a requested program is an original broadcast, and a second playlist wherein the requested program is a previously recorded broadcast program identifying programming and advertising information;

transmitting video data identified in the first playlist and the second playlist to a to a client operative to decode and display the video data;

electronically receiving a control command from the client;

associating one or more local advertisements with the control command from the client wherein the one or more local advertisements include a zone identifier proximate to where the client is located;

determining whether the geographically zoned local advertisement has expired and replacing an expired geographically zoned local advertisement with a replacement advertisement;

modifying, by using a programmable microprocessor, the playlist in accordance with the control command, wherein the advertising information identified in the playlist is updated; and electronically transmitting video data identified in the modified playlist to the client;

capturing subsequent commands from the client during transmission of the video data to the client and determining from the subsequent commands a percentage of the one or more advertisements delivered by the video server to the user.

47. The method of claim 46 comprising updating local advertising information.

48. The method of claim 46 comprising updating national advertising information.

* * * * *